US008370322B2

(12) United States Patent
Berkovits et al.

(10) Patent No.: US 8,370,322 B2
(45) Date of Patent: Feb. 5, 2013

(54) ASSESSING AN INDIVIDUAL'S INFLUENCE OVER DECISIONS REGARDING HOSPITALITY VENUE SELECTION

(75) Inventors: Jeremy Berkovits, Jerusalem (IL); Aaron Naiman, Efrat (IL)

(73) Assignee: Guestwho Ltd., Jerusalem (IL)

( * ) Notice: Subject to any disclaimer, the term of this patent is extended or adjusted under 35 U.S.C. 154(b) by 524 days.

(21) Appl. No.: 12/580,024

(22) Filed: Oct. 15, 2009

(65) Prior Publication Data

US 2011/0093450 A1 Apr. 21, 2011

(51) Int. Cl.
*G06F 17/30* (2006.01)
(52) U.S. Cl. ........................................................ 707/710
(58) Field of Classification Search ................... 707/710
See application file for complete search history.

(56) References Cited

U.S. PATENT DOCUMENTS

| | | | | |
|---|---|---|---|---|
| 2002/0069093 | A1* | 6/2002 | Stanfield | 705/5 |
| 2002/0142841 | A1* | 10/2002 | Boushy | 463/42 |
| 2006/0179053 | A1* | 8/2006 | von Ahn Arellano et al. | 707/6 |
| 2007/0067285 | A1 | 3/2007 | Blume et al. | |
| 2007/0233561 | A1* | 10/2007 | Golec | 705/14 |
| 2008/0065623 | A1 | 3/2008 | Zeng et al. | |
| 2008/0222140 | A1* | 9/2008 | Lagad et al. | 707/5 |
| 2009/0083289 | A1* | 3/2009 | Morris | 707/10 |
| 2009/0125427 | A1 | 5/2009 | Atwood et al. | |
| 2009/0157705 | A1 | 6/2009 | Nomiyama et al. | |

OTHER PUBLICATIONS

Bagga, A. and Baldwin, B., "Entity-based cross-document coreferencing using the vector space model", *Proc. 17th Int. Conf. Computational Linguistics*, 1998, pp. 79-85. http://acl.ldc.upenn.edu/P/P98/P98-1012.pdf.

Bollegala, D., Matsuo, Y. and Ishizuka, M., "Extracting key phrases to disambiguate personal name queries in web search", *Proc. Workshop How Can Computational Linguistics Improve Information Retrieval?*, Sydney, Jul. 2006, pp. 17-24. http://acl.ldc.upenn.edu/W/W06/W06-0803.pdf.

Borkowski, C., "An experimental system for automatic recognition of personal titles and personal names in newspaper texts", Proc. 1969 Conf. Computational Linguistics, 1967, pp. 1-15. http://portal.acm.org/citation.cfm?id=991589.

Chen, Y. and Martin, J., "CU-COMSEM: Exploring rich features for unsupervised web personal name disambiguation", *Proc. 4th Int. Workshop Semantic Evaluations*, Prague, Jun. 2007, pp. 125-128. http://www.acleb.org/anthology-news/S/S07/S07-1024.pdf.

(Continued)

*Primary Examiner* — Hosain Alam
*Assistant Examiner* — Johnese Johnson

(57) ABSTRACT

A method for identifying influential individuals in a customer arrivals list, including importing a customer arrivals list from a hospitality enterprise data source, wherein the arrivals list includes a plurality of entries, each entry corresponding to a customer and including at least a name of the customer, collecting profile information for the name in a designated entry in the arrivals list, from sources on the web, when the collecting profile information identifies one or more individuals who have the name in the designated entry: determining a level of certainty for at least one of the one or more identified individuals, that the identified individual be the same individual as the customer corresponding to the designated entry, based on data in the designated entry, determining a level of influence for the designated entry, based on the collected profile information; and assigning a hospitality venue selection influence metric (HVSIM) to the designated entry, based on the determining a level of certainty and on the determining a level of influence. A system is also described and claimed.

22 Claims, 26 Drawing Sheets

1900

OTHER PUBLICATIONS

Chen, Y. and Martin, J., "Towards robust unsupervised personal name disambiguation", *Proc. 2007 Joint Conf. Empirical Methods in Natural Language Processing and Computational Natural Language Learning*, Prague, 2007, pp. 190-198. http://www.aclweb.org/anthology-new/D/D07/D07-1020.pdf.

Cudré-Mauroux, P., Haghani, P., Jost, M., Aberer, K. and de Meer, H., "idMesh: Graph-based disambiguation of linked data", *WWW '09: Proc. 18th Int. Conf. World Wide Web*, Madrid, Spain, Apr. 20-24, 2009. http://www2009.eprints.org/60/1/p591.pdf.

Fleishman, M. B. and Hovy, E., "Multi-document person name resolution", Conf. reference Resolution and its Applications, 2004. http://www.aclweb.org/anthology-new/W/W04/W04-0701.pdf.

Gollapudi, S. and Sharma, A., "An axiomatic approach for result diversification", *WWW '09: Proc. 18th Int. Conf. World Wide Web*, Madrid, Spain, Apr. 20-24, 2009. http://www2009.eprints.org/39/1/p381.pdf.

Gong, J. and Oard, D., "Determine the entity number in hierarchical clustering for web personal name disambiguation", *WWW '09: Proc. 18th Int. Conf. World Wide Web*, Madrid, Spain, Apr. 20-24, 2009. http://nlp.uned.es/weps/weps2/papers/UMD.pdf.

Han, X. and Zhao, J., "CASIANED: Web personal name disambiguation based on professional categorization", *WWW 2009*, Apr. 20-24, Madrid Spain, 2009. http://nlp.uned.es/weps/weps2/papers/AE-CASIANED.pdf.

Ideda, M., Ono, S., Sato, I., Yoshida, M. and Nakaawa, H., "Person name disambiguation on the web by two-stage clustering", *WWW 2009*, Madrid Spain, Apr. 20-24, 2009. http://nlp.uned.es/weps/weps2/papers/ITC_UT.pdf.

Jiang, L., Wang, J., An, N., Wang, S., Zhan, J. and Li, L., Two birds with one stone: A graph-based framework for disambiguation and tagging people names in web search, *WWW '09: Proc. 18th Int. Conf. World Wide Web*, Madrid, Spain, Apr. 20-24, 2009. http://www2009.eprints.org/181/1/p1201.pdf.

Kalmar, P. and Blume, M., "FICO: Web person disambiguation via weighted similarity of entity contexts", *Proc. 4th Int. Workshop Semantic Evaluations*, Prague, Jun. 2007, pp. 149-152. http://acl.ldc.upenn.edu/W/W07/W07-2030.pdf.

Kalmar, P. and Freitag, D., "Features for web person disambiguation", *WWW '09: Proc. 18th Int. Conf. World Wide Web*, Madrid, Spain, Apr. 20-24, 2009. http://nlp.uned.es/weps/weps2/papers/FICO.pdf.

Kozareva, Z., Vázquez, S. and Montoyo, A., "UA-ZSA: Web page clustering on the basis of name disambiguation", Proc. 4th Int. Conf. Semantic Evaluation, Prague, Jun. 2007, pp. 338-341. http://www.aclweb.org/anthology-new/S/S07/S07-1073.pdf.

Lan, M., Zhang, Y.Z., Lu, Y., Su, J. and Tan, C.L., "Which who are they? People attribute extraction and disambiguation in web search results", *WWW '09: Proc. 18th Int. Conf. World Wide Web*, Madrid, Spain, Apr. 20-24, 2009. http://nlp.uned.es/weps/weps2/papers/ECNU.pdf.

Li, H., Sim, K.C., Kuo, J.-S. and Dong, M., "Semantic transliteration of personal names", *Proc. 45th Ann. Meeting Assoc. Computational Linguistics*, Prague, 2007, pp. 120-127. http://www.aclweb.org/anthology-new/P/P07/P07-1016.pdf.

Magdy, W., Darwish, K., Emam, O. and Hassan, H., "Arabic cross-document person name normalization", *Proc. tth Workshop Important Unresolved Matters*, Prague, 2007, pp. 25-32. http://www.aclweb.org/anthology-new/W/W07/W07-0804.pdf.

Mann, G.S. and Yarowsky, D., "Unsupervised personal name disambiguation", *Proc. 7th Conf. Natural Language Learning at HTL-NAACL 2003*, pp. 33-40. http://acl.ldc.upenn.edu/W/W03/W03-0405.pdf.

Martinez-Romo, J. and Araujo, L., "Web people search disambiguation using language model techniques", *WWW '09: Proc. 18th Int. Conf. World Wide Web*, Madrid, Spain, Apr. 20-24, 2009. http://nlp.uned.es/weps/weps2/papers/UNED.pdf.

Rao, D., Garera, N. and Yarowsky, D., "JHU1: An unsupervised approach to person name disambiguation using web snippets", *Proc. 4th Int. Workshop Semantic Evaluations*, Prague, Jun. 2007, pp. 199-202. http://www.aclweb.org/anthology/S/S07/S07-1042.pdf.

Shaalan, K. and Raza, H., "Person name entity recognition for Arabic", *Proc. 5th Workshop Important Unresolved Matters*, Prague, 2007, pp. 17-24. http://www.aclweb.org/anthology-new/W/W07/W07-0803.pdf.

Suchanek, F. M., Sozio, M. and Weikum, G., "SOFIE: A self-organizing framework for information extraction", *WWW '09: Proc. 18th Int. Conf. World Wide Web*, Madrid, Spain, Apr. 20-24, 2009. http://www2009.eprints.org/64/1/p631.pdf.

Yangarber, R., Lin, W. and Grishman, R., "Unsupervised learning of generalized names", *Proc. 19th Int. Conf. Computational Linguistics*, vol. 1, 2002, pp. 1-7. http://acl.ldc.upenn.edu/coling2002/proceedings/data/area-11/co-395.pdf.

* cited by examiner

FIG. 1A

105

Deluxe Hotel-New York City

| RESNO | NAME | ARRIVAL | DEPART | NIGHTS | Avgrate | ESTARR | GROUP |
|---|---|---|---|---|---|---|---|
| 1059U2 | A Guest | 9/9/2009 | 9/10/2009 | 1 | 295 | 14:00 | 1059 U1 |
| 1053FY | B Guest | 9/7/2009 | 9/10/2009 | 3 | 267 | 23:59 | |
| 1059V9 | C Guest | 8/27/2009 | 8/29/2009 | 2 | 380 | 23:59 | 1059 V9 |
| 1059ZE | D Guest | 8/27/2009 | 8/29/2009 | 2 | 380 | 23:59 | 10292 F |
| 1059DK | E Guest | 9/1/2009 | 9/4/2009 | 3 | 250 | | 10292 F |
| 105900 | F Guest | 9/1/2009 | 9/3/2009 | 2 | 250 | | |
| 10602H | G Guest | 8/30/2009 | 8/31/2009 | 1 | 420 | 23:59 | |
| 105821 | H Guest | 8/28/2009 | 8/30/2009 | 2 | 0 | 23:59 | 105821 |
| 1053CY | I Guest | 9/3/2009 | 9/5/2009 | 2 | 400 | 11:00 | |
| 1046UZ | J Guest | 9/4/2009 | 9/5/2009 | 1 | 380 | 14:00 | |
| 1057RL | K Guest | 9/6/2009 | 9/7/2009 | 1 | 0 | 12:30 | |
| 1058TU | L Guest | 8/30/2009 | 8/31/2009 | 1 | 365 | 11:30 | 1058 TQ |
| 1041BT | M Guest | 8/30/2009 | 9/2/2009 | 3 | 340 | 16:00 | 1041 BN |
| 1058DC | N Guest | 8/29/2009 | 8/30/2009 | 1 | 400 | 23:59 | 10065 Y |
| 106047 | O Guest | 9/5/2009 | 9/7/2009 | 2 | 95 | 23:59 | 106044 |
| 1059TV | P Guest | 9/2/2009 | 9/3/2009 | 1 | 295 | | 1059 TR |
| 1059J5 | Q Guest | 9/2/2009 | 9/3/2009 | 1 | 250 | 23:59 | 10292 F |
| 106048 | R Guest | 9/5/2009 | 9/7/2009 | 2 | 95 | 23:59 | 106044 |
| 1060PL | S Guest | 9/1/2009 | 9/2/2009 | 1 | 250 | 23:59 | 10292 F |
| 1059WB | T Guest | 9/6/2009 | 9/7/2009 | 1 | 365 | 12:00 | |
| 1057HV | U Guest | 8/30/2009 | 8/31/2009 | 1 | 295 | 10:00 | |
| 1055UC | V Guest | 9/2/2009 | 9/4/2009 | 2 | 190 | 23:59 | 1006 AB |
| 1055UF | W Guest | 9/2/2009 | 9/4/2009 | 2 | 190 | 23:59 | 1006 AB |
| 1055UG | X Guest | 9/2/2009 | 9/4/2009 | 2 | 190 | 23:59 | 1006 AB |
| 10420D | Y Guest | 8/27/2009 | 8/30/2009 | 3 | 780 | 23:59 | 1041 VL |
| 105929 | Z Guest | 9/1/2009 | 9/4/2009 | 3 | 250 | | 10292 F |

110 CUSTOMER ARRIVALS LIST ANALYSIS SYSTEM

Deluxe Hotel - New York City

| RESNC | NAME | PACKA | GNAME | ANOTES | vip1 | vip1des | ADDRESS1 | ADDRESS2 | ADDRESS3 | CITY | STATE | COUNTRY | EMAIL |
|---|---|---|---|---|---|---|---|---|---|---|---|---|---|
| 1059U1 | A Guest | SS09CD | | total of both rooms to Mr | | | | | | | | | |
| 1059U2 | B Guest | ASL9CD | | own account | | | | | | | | | |
| 1059U3 | C Guest | SS09E | | own account | | | | | | | | | |
| 1059U4 | D Guest | SS09E | | own account | | | | | | | | | |
| 1059U5 | E Guest | SLOOP | Slooper | Own account | | | | | | | | | |
| 1059U6 | F Guest | SLOOP | Slooper | Own account | | | | | | | | | |
| 1059U7 | G Guest | SSN9E | | Own Account | | | | | | | | | |
| 1059U8 | H Guest | PRICOM | | Comp BB/ Own Extras | | | | | | | | | |
| 1059U9 | I Guest | SDI9CD | | Own account | | | | | | | | | |
| 1059U1 | J Guest | SS09E | | Own Account | | | | | | | | | |
| 1059U1 | K Guest | DFR08 | | own account | | | | | | | | | |
| 1059U1 | L Guest | SSN9LS | | Own account | | | | | | | | | |
| 1059U1 | M Guest | SS09LS | | Own account | | | | | | | | | |
| 1059U1 | N Guest | HCD9C | Hotel C | Own Account | | | | | | | | | |
| 1059U1 | O Guest | DFR08 | | own account | | | | | | | | | |
| 1059U1 | P Guest | SS09CD | | * to Mr | | | | | | | | | |
| 1059U1 | Q Guest | SLOOP | Slooper | Own account | | | | | | | | | |
| 1059U1 | R Guest | DFR08 | | own account | | | | | | | | | |
| 1059U1 | S Guest | SLOOP | Slooper | Own account | | | | | | | | | |
| 1059U2 | T Guest | SSN9LS | | Own account | | | | | | | | | |
| 1059U2 | U Guest | JWSPCD | | Own account | | | | | | | | | |
| 1059U2 | V Guest | DSUO0 | Doogeo | Full account to | | | | | | | | | |
| 1059U2 | W Guest | DSUO0 | Doogeo | Full account to | | | | | | | | | |
| 1059U2 | X Guest | DSUO0 | Doogeo | Full account to | | | | | | | | | |
| 1059U2 | Y Guest | SRADLS | | Full account to | | | | | | | | | |
| 1059U2 | Z Guest | SLOOP | Slooper | Own account | | | | | | | | | |

115

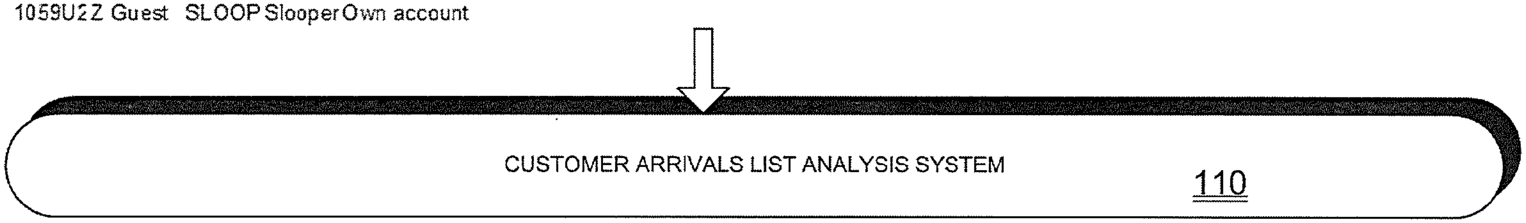

FIG. 1B

The Deluxe Hotel

New York City

11-Aug-09

| RE SNO | NAME | ARRIVAL | DEPART | VIP Status |
|---|---|---|---|---|
| 1059U1 | A Guest | 03/09/09 | 05/09/09 | |
| 1059U2 | B Guest | 04/09/09 | 05/09/09 | |
| **1059U3** | **C Guest** | **06/09/09** | **07/09/09** | * |
| 1059U4 | D Guest | 30/08/09 | 31/08/09 | |
| 1059U5 | E Guest | 30/08/09 | 02/09/09 | |
| 1059U6 | F Guest | 29/08/09 | 30/08/09 | |
| 1059U7 | G Guest | 05/09/09 | 07/09/09 | |
| 1059U8 | H Guest | 02/09/09 | 03/09/09 | |
| 1059U9 | I Guest | 02/09/09 | 03/09/09 | * |
| 1059U10 | J Guest | 05/09/09 | 07/09/09 | |
| 1059U11 | K Guest | 01/09/09 | 02/09/09 | * |
| 1059U12 | L Guest | 06/09/09 | 07/09/09 | |
| 1059U13 | M Guest | 30/08/09 | 31/08/09 | |
| 1059U14 | N Guest | 02/09/09 | 04/09/09 | |
| 1059U15 | O Guest | 02/09/09 | 04/09/09 | |
| 1059U16 | P Guest | 02/09/09 | 04/09/09 | |
| 1059U17 | Q Guest | 27/08/09 | 30/08/09 | |
| 1059U18 | R Guest | 01/09/09 | 04/09/09 | * |
| 1059U19 | S Guest | 06/09/09 | 07/09/09 | |
| 1059U20 | T Guest | 01/09/09 | 04/09/09 | |

210 The Deluxe Hotel
New York City
11-Aug-09

| RE SNO | NAME | ARRIVAL | DEPART | GuestWho rating |
|---|---|---|---|---|
| 1059U3 | C Guest | 01/09/09 | 04/09/09 | 78 |
| 1059U6 | F Guest | 05/09/09 | 07/09/09 | 68 |
| 1059U9 | I Guest | 01/09/09 | 04/09/09 | 53 |
| 1059U18 | R Guest | 01/09/09 | 02/09/09 | 76 |
| 1059U23 | W Guest | 01/09/09 | 03/09/09 | 79 |
| 1059U24 | X Guest | 01/09/09 | 04/09/09 | 59 |

FIG. 2C

215

110 CUSTOMER ARRIVALS LIST ANALYSIS SYSTEM

SAMPLE GOLD RESULTS PAGE

The Deluxe Hotel
New York City
11-Aug 09

| RESNO | NAME | ARRIVAL | DEPART | Guest Who Rating | Reason | Information link |
|---|---|---|---|---|---|---|
| **1059U3** | **Charlie Wilson** | **01/09/09** | **04/09/09** | **78** | **Chief Financial Officer – ACME International Ltd – an oil and natural gas drilling equipment co, ranked ___ on forbes top 2000 list** | **www.forbes.top100.com** |
| 1059U6 | David Smith | 05/09/09 | 07/09/09 | 68 | Deputy Chairman Barclays Plc | www.zoominfo.com |
| 1059U9 | Steven Brown | 01/09/09 | 04/09/09 | 53 | Emeritus Professor of French at the University of Leeds, England. He won a Scott–Moncrieff prize for his edition of Albert Cohen's Belle du Seigneur. | www.leedsuniversity.ac.uk |
| 1059U18 | Igor Krem | 01/09/09 | 02/09/09 | 76 | Manager of Melchester Rovers Football Club or founder of ACME industries or Formula 1 journalist or football player for Bamet FC | www.linkedin.com |
| **1059U23** | **Paul Lane** | **01/09/09** | **03/09/09** | **79** | **Actor in US Comedy Series – Friendlies** | **www.friendlies.com** |
| **1059U24** | **Xavier Raquet** | **01/09/09** | **04/09/09** | **59** | **Tennis Player – ranked #5 in Men's World rankings** | **www.worldtennisrankings.com** |

305

310

315

800

ASSESSING AN INDIVIDUAL'S INFLUENCE OVER DECISIONS REGARDING HOSPITALITY VENUE SELECTION

FIELD OF THE INVENTION

The field of the present invention is web analysis.

BACKGROUND OF THE INVENTION

The following U.S. patent publications are believed to be generally relevant to the field of the invention.

1. U.S. Publication No. 2009/0125427 A1 to Atwood et al, May 14, 2009.
2. U.S. Publication No. 2009/0157705 A1 to Nomiyama et al., Jun. 18, 2009.
3. U.S. Publication No. 2007/0067285 A1 to Blume et al., Mar. 22, 2009.
4. U.S. Publication No. 2008/0065623 A1 to Zeng et al., Mar. 13, 2008.

The following non-patent publications are believed to be generally relevant to the field of the invention.

5. Bagga, A. and Baldwin, B., "Entity-based cross-document coreferencing using the vector space model", *Proc. 17th Int. Conf. Computational Linguistics,* 1998, pgs. 79-85. http://acl.ldc.upenn.edu/P/P98/P98-1012.pdf.
6. Bollegala, D., Matsuo, Y. and Ishizuka, M., "Extracting key phrases to disambiguate personal name queries in web search", *Proc. Workshop How Can Computational Linguistics Improve Information Retrieval?"*, Sydney, July 2006, pgs. 17-24. http://acl.ldc.upenn.edu/W/W06/W06-0803.pdf.
7. Borkowski, C., "An experimental system for automatic recognition of personal titles and personal names in newspaper texts", Proc. 1969 Conf. Computational Linguistics, 1967, pgs. 1-15. http://portal.acm.org/citation.cfm?id=991589.
8. Chen, Y. and Martin, J., "CU-COMSEM: Exploring rich features for unsupervised web personal name disambiguation", *Proc. 4th Int. Workshop Semantic Evaluations*, Prague, June 2007, pgs. 125-128. http://www.aclweb.org/anthology-new/S/S07/S07-1024.pdf.
9. Chen, Y. and Martin, J., "Towards robust unsupervised personal name disambiguation", *Proc.* 2007 *Joint Conf. Empirical Methods in Natural Language Processing and Computational Natural Language Learning*, Prague, 2007, pgs. 190-198. http://www.aclweb.org/anthology-new/D/D07/D07-1020.pdf.
10. Cudré-Mauroux, P., Haghani, P., Jost, M., Aberer, K. and de Meer, H., "idMesh: Graph-based disambiguation of linked data", *WWW '09: Proc. 18th Int. Conf. World Wide Web*, Madrid, Spain, Apr. 20-24, 2009. http://www2009.eprints.org/60/1/p591.pdf.
11. Fleishman, M. B. and Hovy, E., "Multi-document person name resolution", Conf. reference Resolution and its Applications, 2004. http://www.aclweb.org/anthology-new/W/W04/W04-0701.pdf.
12. Gollapudi, S. and Sharma, A., "An axiomatic approach for result diversification", *WWW '09: Proc. 18th Int. Conf. World Wide Web,* Madrid, Spain, Apr. 20-24, 2009. http://www2009.eprints.org/39/1/p381.pdf.
13. Gong, J. and Oard, D., "Determine the entity number in hierarchical clustering for web personal name disambiguation", *WWW '09: Proc. 18th Int. Conf. World Wide Web*, Madrid, Spain, Apr. 20-24, 2009. http://nlp.uned.es/weps/weps2/papers/UMD.pdf.
14. Han, X. and Zhao, J., "CASIANED: Web personal name disambiguation based on professional categorization", *WWW* 2009, Apr. 20-24, Madrid Spain, 2009. http://nlp.uned.es/weps/weps2/papers/AE-CASIANED.pdf.
15. Ikeda, M., Ono, S., Sato, I., Yoshida, M. and Nakagawa, H., "Person name disambiguation on the web by two-stage clustering", *WWW* 2009, Madrid Spain, Apr. 20-24, 2009. http://nlp.uned.es/weps/weps2/papers/ITC UT. pdf.
16. Jiang, L., Wang, J., An, N., Wang, S., Zhan, J. and Li, L., Two birds with one stone: A graph-based framework for disambiguation and tagging people names in web search", *WWW '09: Proc. 18th Int. Conf. World Wide Web*, Madrid, Spain, Apr. 20-24, 2009. http://www2009.eprints.org/181/1/p1201.pdf.
17. Kalmar, P. and Blume, M., "FICO: Web person disambiguation via weighted similarity of entity contexts", *Proc. 4th Int. Workshop Semantic Evaluations*, Prague, June 2007, pgs. 149-152. http://acl.ldc.upenn.edu/W/W07/W07-2030.pdf.
18. Kalmar, P. and Freitag, D., "Features for web person disambiguation", *WWW '09: Proc. 18th Int. Conf. World Wide Web,* Madrid, Spain, Apr. 20-24, 2009. http://nlp.uned.es/weps/weps2/papers/FICO.pdf.
19. Kozareva, Z., Vàzquez, S. and Montoyo, A., "UA-ZSA: Web page clustering on the basis of name disambiguation", Proc. 4th Int. Conf. Semantic Evaluation, Prague, June 2007, pgs. 338-341. http://www.aclweb.org/anthology-new/S/S07/S07-1073.pdf.
20. Lan, M., Zhang, Y. Z., Lu, Y., Su, J. and Tan, C. L., "Which who are they? People attribute extraction and disambiguation in web search results", *WWW '09: Proc. 18th Int. Conf. World Wide Web*, Madrid, Spain, Apr. 20-24, 2009. http://nlp.uned.es/weps/weps2/papers/ECNU.pdf.
21. Li, H., Sim, K. C., Kuo, J. S. and Dong, M., "Semantic transliteration of personal names", *Proc. 45th Ann. Meeting Assoc. Computational Linguistics*, Prague, 2007, pgs. 120-127. http://www.aclweb.org/anthology-new/P/P07/P07-1016.pdf.
22. Magdy, W., Darwish, K., Emam, O. and Hassan, H., "Arabic cross-document person name normalization", *Proc. 5th Workshop Important Unresolved Matters*, Prague, 2007, pgs. 25-32. http://www.aclweb.org/anthology-new/W/W07/W07-0804.pdf.
23. Mann, G. S. and Yarowsky, D., "Unsupervised personal name disambiguation", *Proc. 7th Conf. Natural Language Learning at HTL-NAACL* 2003, 2003, pgs. 33-40. http://acl.ldc.upenn.edu/W/W03/W03-0405.pdf.
24. Martinez-Romo, J. and Araujo, L., "Web people search disambiguation using language model techniques", *WWW '09: Proc. 18th Int. Conf. World Wide Web*, Madrid, Spain, Apr. 20-24, 2009. http://nlp.uned.es/weps/weps2/papers/UNED.pdf.
25. Rao, D., Garera, N. and Yarowsky, D., "JHU1: An unsupervised approach to person name disambiguation using web snippets", *Proc. 4th Int. Workshop Semantic Evaluations*, Prague, June 2007, pgs. 199-202. http://www.aclweb.org/anthology/S/S07/S07-1042.pdf.
26. Shaalan, K. and Raza, H., "Person name entity recognition for Arabic", *Proc. 5th Workshop Important Unresolved Matters*, Prague, 2007, pgs. 17-24. http://www.aclweb.org/anthology-new/W/W07/W07-0803.pdf.
27. Suchanek, F. M., Sozio, M. and Weikum, G., "SOFIE: A self-organizing framework for information extraction", *WWW '09: Proc. 18th Int. Conf. World Wide Web*, Madrid, Spain, Apr. 20-24, 2009. http://www2009.eprints.org/64/1/p631.pdf.

28. Yangarber, R., Lin, W. and Grishman, R., "Unsupervised learning of generalized names", *Proc. 19th Int. Conf. Computational Linguistics, Vol.* 1, 2002, pages 1-7. http://acl.ldc.upenn.edu/coling2002/proceedings/data/area-11/co-395.pdf.

SUMMARY OF THE DESCRIPTION

For hospitality enterprises, such as hotels, providing the right experience for influential customers results in direct revenues from returning guests, and creates ambassadors who both directly and indirectly contribute to revenue growth. The more a hotel knows about its customers, the better experience it can create for selected individuals and the better the reputation that the hotel will develop.

Aspects of the present invention relate to a system and method for identifying VIPs on a hotel arrivals list, and for conveying this information to hotel staff in advance of the VIPs' arrivals, and in a format that enables intelligent decision making and optimum use of the hotel's management and other resources. The term "VIP", as used herein, refers broadly to any type of individual who actively or passively determines or influences other people's decisions for selecting hospitality venues.

More generally, aspects of the present invention relate to a novel hospitality venue selection influence metric (HVSIM), which measures the extent to which a particular individual is likely to determine or influence, actively or passively, the decisions of other people in their selection of a hospitality venue. For example, a columnist for a Travel & Leisure section of a newspaper, a writer of a travel blog, and a manager of employee travel at a corporation, generally have much influence over decisions of others, and thus would generally have a high HVSIM. A person who attends a professional conference, and a student, generally have less influence over decisions of others and thus would generally have a lower HVSIM.

In accordance with an embodiment of the present invention, the HVSIM of a person is based at least on:

a) the level of certainty as to the identity of the person, based on the person's name and additional information that may be available about the person, including inter alia the person's physical address, e-mail address, date of birth, place of employment, job title, accompanying travelers, travel agent and membership in hospitality rewards programs; and b) the person's level of influence over other people's decisions in selecting hospitality venues, based on the person's presence on one or more designated web biography corpuses, and on a ranking of the relative significance, in the context of the hospitality industry, of websites that refer to the person.

Regarding level of certainty, there may be, for example, a Peter Smith who is a very influential person, but there may also be other people named Peter Smith who are less influential. The HVSIM factors in the level of certainty as to whether the influential Peter Smith is in fact the same individual as the person on the hotel's customer arrivals list. Regarding level of influence, the HVSIM factors in the significance of references to the person that are found on the web. For example, a WIKIPEDIA™ bio page for a person is a significant reference, whereas a FACEBOOK™ page is a less significant reference. Both the level of certainty and the level of influence are weighted in assigning an HVSIM to a person.

Embodiments of the present invention provide an agent that efficiently searches publicly available information from a multitude of carefully chosen sources, and intelligently builds a profile of an identified individual. The individual is then assigned an HVSIM based on various criteria, some customizable by the hotel; and the HVSIM is then used by the hotel in making its personalization and prioritization decisions. The HVSIM is generally a score from 0 to 100 with higher scores reflecting more influential customers and more certainty.

The HVSIM provided by embodiments of the present invention is a valuable tool for a hotel in its relationship with its guests, enabling quick and specific identification of guests that the hotel may wish to treat in a particular manner. The specific use and utility of the HVSIM may vary depending on several factors, including inter alia the nature of the hotel, its management approach, its clientele, the types of rooms and services it offers, its level of occupancy, and even the time of year. For example, some hotels may choose to use the HVSIM to make decisions regarding special treatment of guests, including inter alia room upgrades and exclusive services. In such hotels, the highest HVSIM guests on a given day are candidates for such treatment. Other hotels may utilize the HVSIM for determining a general group of guests who should receive complimentary services. In such cases all guests with an HVSIM equal to or higher than a specific value, as determined by the hotel, would receive the complimentary services.

Embodiments of the present invention provide (i) a front-end user interface via which hotel personnel enter an individual name and additional identifying information as may be available, or upload an entire reservations list, (ii) a back-end web scraping engine, and (iii) output to the hotel in the form of an annotated list with HVSIMs, and additional information about identified individuals.

Embodiments of the present invention include the following processes:

Input: Assimilate data provided in various formats by hotel reservations systems, the data including the name of arriving guests and optional additional information such as home/business address/phone number, employer and occupation.

Profile Generation: Collect information regarding individuals having a specified name.

Profile Analysis: In cases where several identified individuals have the same name, utilize the data provided in conjunction with web information to cluster the collected information and best identify the relevant individual.

HVSIM Calculation: Utilize generated profiles to determine HVSIMs for individuals, and identify potential VIPs.

Output: Provide the hotel with useful information.

There is thus provided in accordance with an embodiment of the present invention a method for identifying influential individuals in a customer arrivals list, including importing a customer arrivals list from a hospitality enterprise data source, wherein the arrivals list includes a plurality of entries, each entry corresponding to a customer and including at least a name of the customer, collecting profile information for the name in a designated entry in the arrivals list, from sources on the web, when the collecting profile information identifies one or more individuals who have the name in the designated entry: determining a level of certainty for at least one of the one or more identified individuals, that the identified individual be the same individual as the customer corresponding to the designated entry, based on data in the designated entry, determining a level of influence for the designated entry, based on the collected profile information; and assigning a hospitality venue selection influence metric (HVSIM) to the designated entry, based on the determining a level of certainty and on the determining a level of influence.

Additionally, in accordance with an embodiment of the present invention, collecting profile information includes retrieving web pages with biographical information for the name.

Further, in accordance with an embodiment of the present invention, the level of influence is based on the existence of at least one web page for the name from one or more designated web biography corpuses, and on a number of links to such web pages from web pages outside the designated web biography corpuses.

Yet further, in accordance with an embodiment of the present invention, the one or more designated web biography corpuses include Wikipedia.

Moreover, in accordance with an embodiment of the present invention, the hospitality enterprise is a member of the group consisting of a hotel, a cruise ship, a car rental agency and a restaurant.

There is additionally provided in accordance with an embodiment of the present invention a system for identifying influential individuals in a customer arrivals list, including a data importer for importing a customer arrivals list from a hospitality enterprise data source, wherein the arrivals list includes a plurality of entries, each entry corresponding to a customer and including at least a name of the customer, a profile generator, coupled with the data importer, for collecting profile information for the name in a designated entry in the arrivals list, from sources on the web, a profile analyzer, coupled with the data importer and with the profile generator, (i) for determining a level of certainty for at least one or more individuals whose profile information was collected by said profile generator, that the identified individual be the same individual as the customer corresponding to the designated entry, based on data in the designated entry, and (ii) for determining a level of influence for the designated entry, based on the profile information collected by the profile generator, and a hospitality venue selection influence metric (HVSIM) calculator, coupled with the data importer and with the profile analyzer, for assigning an HVSIM to the designated entry, based on the level of certainty and on the level of influence determined by the profile analyzer.

Further, in accordance with an embodiment of the present invention, the profile generator retrieves web pages with biographical information for the name.

Yet further, in accordance with an embodiment of the present invention, the level of influence is based on the existence of at least one web page for the name, retrieved by the profile generator from one or more designated web biography corpuses, and on a number of links to such web pages from web pages outside the designated web biography corpuses.

Moreover, in accordance with an embodiment of the present invention, the one or more designated web biography corpuses include Wikipedia.

Additionally, in accordance with an embodiment of the present invention, the enterprise is a member of the group including a hotel, a cruise ship, a car rental agency and a restaurant.

There is further provided in accordance with an embodiment of the present invention, a method for identifying influential individuals in a customer arrivals list, including importing a customer arrivals list from a hospitality enterprise data source, wherein the arrivals list includes a plurality of entries, each entry corresponding to a customer and including at least a name of the customer, retrieving web snippets of biographical data for the name in a designated entry in the arrivals list, clustering the retrieved web snippets into clusters corresponding to different individuals with the same name, identifying the cluster corresponding to the individual that best matches the customer corresponding to the designated entry, determining a level of certainty that the identified cluster corresponds to the designated entry in the arrivals list, determining a level of influence of the identified cluster, based on the web snippets in the cluster, and assigning a hospitality venue selection influence metric (HVSIM) to the identified cluster, based on the level of certainty and on the level of influence.

Yet further, in accordance with an embodiment of the present invention, the level of influence is based on the number of web snippets retrieved for the individual corresponding to the identified cluster.

Moreover, in accordance with an embodiment of the present invention, the level of influence is based on the existence of at least one web snippet for the individual corresponding to the identified cluster, retrieved from one or more designated web biography corpuses.

Additionally, in accordance with an embodiment of the present invention, the one or more designated web biography corpuses include Wikipedia.

There is further provided in accordance with an embodiment of the present invention, a system for identifying influential individuals in a customer arrivals list, including a data importer, for importing a customer arrivals list from a hospitality enterprise data source, wherein the arrivals list includes a plurality of entries, each entry corresponding to a customer and including at least a name of the customer, an infobot, coupled with the data importer, for retrieving web snippets of biographical data for the name in a designated entry in the arrivals list, a clusterer, coupled with the infobot, for clustering the retrieved web snippets into clusters corresponding to different individuals with the same name, a cluster matcher, coupled with the clusterer, with the infobot and with the data importer, for identifying the cluster corresponding to the individual that best matches the customer corresponding to the designated entry, a hospitality venue selection influence metric (HVSIM) calculator, coupled with the cluster matcher and with the infobot, (i) for determining a level of certainty that the identified cluster corresponds to the designated entry in the arrivals list, (ii) for determining a level of influence of the identified cluster, based on the web snippets in the cluster, and (iii) for assigning an HVSIM to the identified cluster, based on the level of certainty and on the level of influence.

Yet further, in accordance with an embodiment of the present invention, the HVSIM calculator determines the level of influence based on the number of web snippets for the individual corresponding to the identified cluster, retrieved by the infobot.

Moreover, in accordance with an embodiment of the present invention, the HVSIM calculator determines the level of influence based on the existence of at least one web snippet for the individual corresponding to the identified cluster, retrieved by the infobot from one or more designated web biography corpuses.

Additionally, in accordance with an embodiment of the present invention, the one or more designated web biography corpuses include Wikipedia.

There is further provided in accordance with an embodiment of the present invention a method for assessing the influence of an identified entity, including obtaining a plurality of web pages from a plurality of web sites, each web page including at least one reference to an identified entity, determining an overall web importance of the plurality of web sites by combining web importance scores of each one of the plurality of web sites, based on a list of web sites and their individual web importance scores, and assigning a selection influence metric (SIM) to the identified entity according to the ratio of the overall web importance of the plurality of the web sites, to the number of the plurality of web pages obtained.

There is yet further provided in accordance with an embodiment of the present invention a system for assessing the influence of an identified entity, including a web agent for obtaining a plurality of web pages from a plurality of web sites, each web page including at least one reference to an identified entity, a database manager for storing a list of web sites and individual web importance scores therefor, and a selection influence metric (SIM) generator, coupled with the web agent and with the database manager, for determining an overall web importance of the plurality of web sites by combining web importance scores of each one of the plurality of web sites, and for assigning a SIM to the identified entity according to the ratio of the overall web importance of the plurality of the web sites, to the number of the plurality of web pages obtained.

BRIEF DESCRIPTION OF THE DRAWINGS

The present invention will be more fully understood and appreciated from the following detailed description, taken in conjunction with the drawings in which:

FIGS. 1A and 1B are illustrations of a sample customer arrivals list received from a hospitality enterprise, for processing by a customer arrivals list analyzer, in accordance with an embodiment of the present invention;

FIGS. 2A-2C are illustrations of summary reports of potential VIPs in the customer arrivals list, generated by a customer arrivals list analyzer, in accordance with an embodiment of the present invention;

DETAILED DESCRIPTION

Figure 2A:
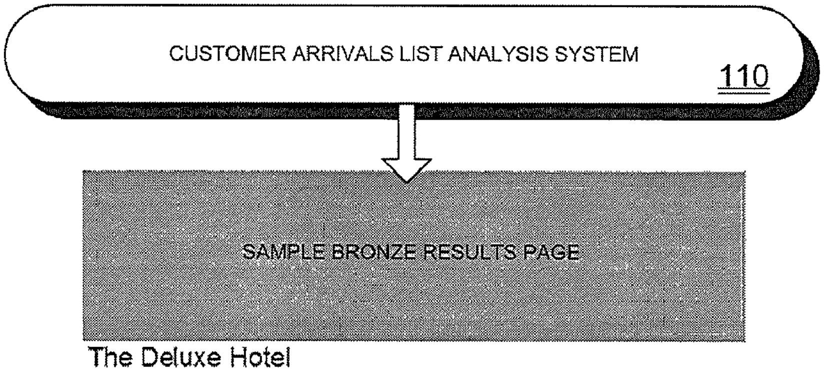

Aspects of the present invention relate to systems and methods for automatically deriving a hospitality venue selection influence metric (HVSIM) for a designated person. A hospitality enterprise with a customer arrivals list, using the present invention, identifies potential VIPs in the arrivals list; i.e., customers who actively or passively determine or influence other people's decisions in selecting hospitality venues.

The HVSIM is generally a score from 0 to 100, with higher scores reflecting more influential customers and more certainty. In accordance with an embodiment of the present invention, the HVSIM of a person is based at least on:

c) the level of certainty as to the identity of the person, based on the person's name and additional information that may be available about the person, including inter alia the person's physical address, e-mail address, date of birth, place of employment, job title, accompanying travelers, travel agent and membership in hospitality rewards programs; and d) the person's level of influence over other people's decisions in selecting hospitality venues, based on the person's presence on one or more designated biography web corpuses, and on a ranking of the relative significance, in the context of the hospitality industry, of websites that refer to the person.

Regarding level of certainty, there may be, for example, a Peter Smith who is a very influential person, but there may also be other people named Peter Smith who are less influential. The HVSIM factors in the level of certainty as to whether the influential Peter Smith is in fact the same individual as the person on the hotel's customer arrivals list. Regarding level of influence, the HVSIM factors in the significance of references to the person that are found on the web. For example, a WIKIPEDIA™ bio page for a person is a significant reference, whereas a FACEBOOK™ page is a less significant reference. Both the level of certainty and the level of influence are weighted in assigning an HVSIM to a person.

The HVSIMs provided by embodiments of the present invention are a valuable tool for a hospitality enterprise in its relationship with its guests, enabling quick and specific identification of guests that the enterprise may wish to treat in a particular manner. The specific use and utility of the HVSIMs may vary depending on several factors, including inter alia the nature of the hospitality enterprise, its management approach, its clientele, the types of rooms and services it offers, its level of occupancy, and even the time of year. For example, some hotels may use the HVSIMs to make decisions regarding special treatment of guests, including inter alia room upgrades and exclusive services. In such hotels, the guests with the highest HVSIMs on a given day are candidates for such treatment. Other hotels may utilize the HVSIMs for determining a general group of guests who should receive complimentary services. In such cases all guests with an HVSIM equal to or higher than a specific value, as determined by the hotel, would receive the complimentary services.

There are several usage scenarios for the present invention, including inter alia (i) a subscription service, (ii) an integrated solution, and (iii) a web interface.

In the subscription service usage scenario, a hospitality enterprise subscribes to a service operative in accordance an embodiment of the present invention, and provides to the service its customer arrivals list. The arrivals list is provided in the form of a list of customer names and, optionally, additional identifying or descriptive information about the customers. The arrivals list may be formatted as an Excel spreadsheet, or such other data format for representing a list of entries.

The hospitality enterprise receives as output, from the service, an annotated list, in a conventional or proprietary format. The annotated list may contain more or less information, depending on the enterprise's subscription level with the service. For a basic subscription level, referred to herein as "bronze level", the annotated list includes simple graphical presentations, such as use of asterisks or such other symbols or graphics, indicating that specific customers in the arrivals list are important to the enterprise, and warrant special treatment or additional investigation by the enterprise. For a higher subscription level, referred to herein as a "silver level", the annotated list includes HVSIMs corresponding to the customers' influence over others' decisions in selecting a hospitality venue. For a yet higher subscription level, referred to herein as a "gold level", the annotated list also includes selections of relevant biographical information regarding the influential customers. The biographical information is assembled using information gleaned from web search engines and web crawlers.

Reference is made to FIGS. 1A and 1B, which are illustrations of a sample customer arrivals list, received from a hospitality enterprise, for processing by a customer arrivals list analyzer system 110, in accordance with an embodiment of the present invention. A customer arrivals list 105, shown in FIG. 1A, may be formatted as an Excel spreadsheet, or a CSV file, or such other standard or proprietary format for representing lists. The enterprise provides a list of customer names, together with additional information that is available about each customer.

In accordance with an embodiment of the present invention, customer arrivals list 105 is re-formatted into a list 115, shown in FIG. 1B, suitable for upload into system 110. The re-formatted list is ordered by columns as follows: Package Name, Notes, VIP, VIP Description, Address1, Address2, Address3, City, State, Country and E-mail.

Figure 2B:
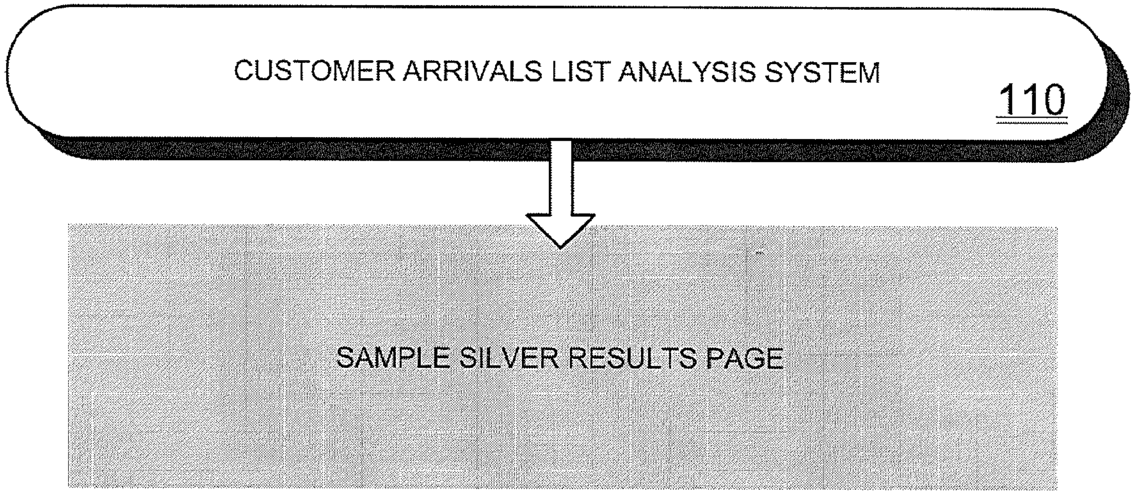

Reference is made to FIGS. 2A-2C, which are illustrations of summary reports of potential VIPs in the customer arrivals list, generated by customer arrivals list analyzer 110, in accordance with an embodiment of the present invention. A bronze level summary report 205, shown in FIG. 2A, displays an asterisk adjacent to customers who may be VIPs, as determined by system 110. Moreover, when system 110 has a high level of confidence that a listed customer is a VIP, the identified customer is displayed in bold or with such other emphasis.

A silver level summary report 210, shown in FIG. 2B, displays an HVSIM for each customer identified as a possible VIP. In accordance with an embodiment of the present invention, the HVSIM for a customer is based on the number of pages that have information about the customer, from one or more designated web biography corpuses. The HVSIM is also based on a total number of web hits, referred to as the "web presence". The HVSIM is a score from 0 to 100 with higher ratings reflecting more influential customers. The HVSIM is generally a score from 0 to 100 with higher scores reflecting more important customers. As above, when system 110 has a high level of confidence that a listed customer is a VIP, the identified customer is displayed in bold.

A gold level summary report 215, shown in FIG. 2C, also provides brief biographical information about each customer identified as a possible VIP, and a link to a web page with additional information about the customer. As above, when system 110 has a high level of confidence that a listed customer is a VIP, the identified customer is displayed in bold.

In the integrated solution usage scenario, an enterprise has a service operative in accordance with the present invention integrated within the enterprise's database system, such as a hotel property management system (PMS). A PMS is an enterprise computer system used by hospitality enterprises for managing guest bookings, online reservations, points of sale, telephone and other amenities. A PMS often interfaces with enterprise database systems, with central reservation systems, with revenue and yield management systems, with front office systems, with back office systems, and with point of sale systems. In accordance with an embodiment of the present invention, the PMS automatically exports customer arrivals data and sends it to the integrated service for upload. Generally, the customer arrivals list is exported as part of the PMS nightly audit.

The PMS may exchange data with the integrated service using XML tables or CSV files, or such other format for representing a customer list. The output of the integrate service may be integrated into an enterprise database system for future reference.

Figure 3A:
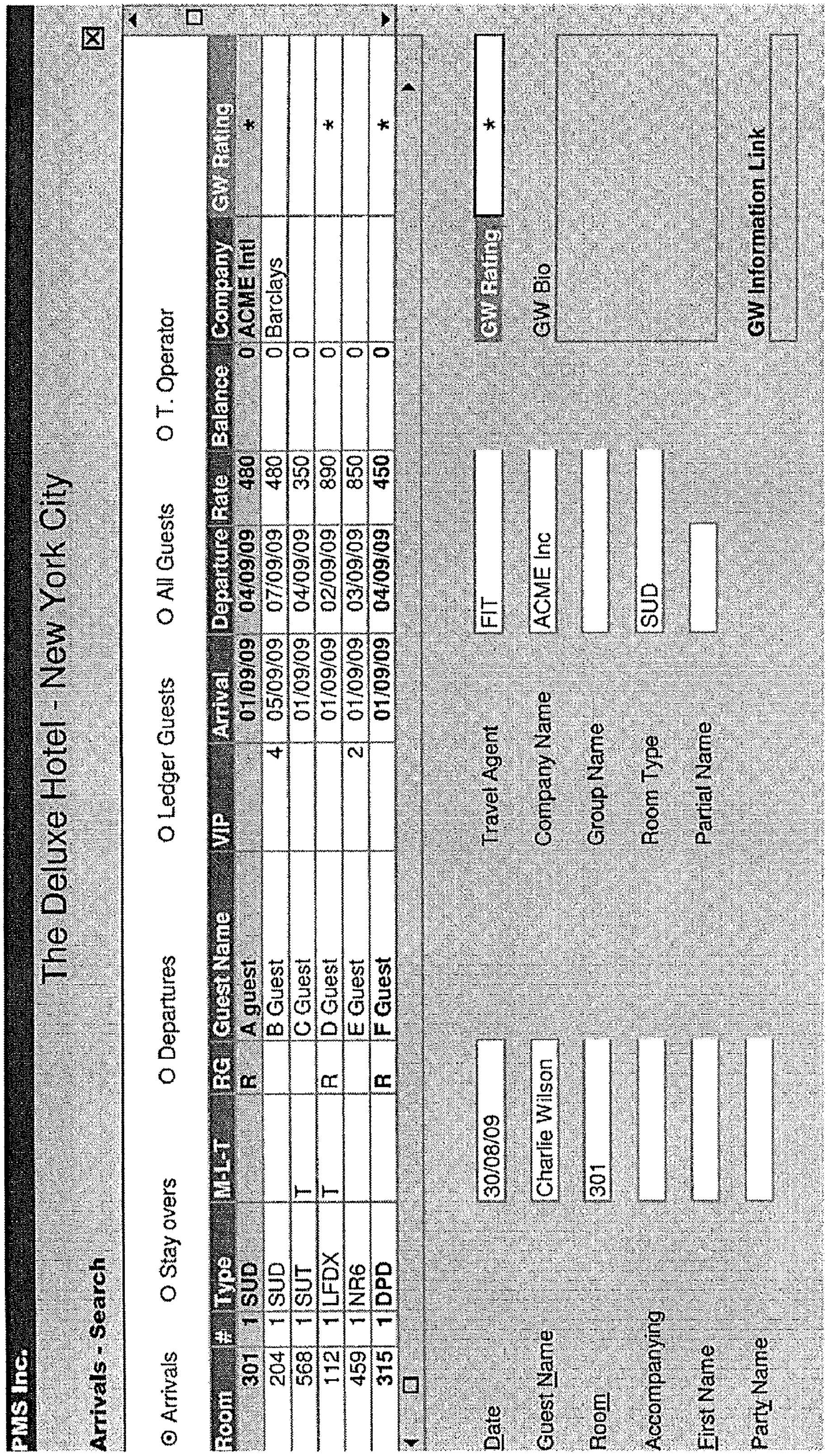
FIGS. 3A-3C are illustrations of summary reports of potential VIPs in the customer arrivals list integrated into a property management system, in accordance with an embodiment of the present invention.
Figure 3B:
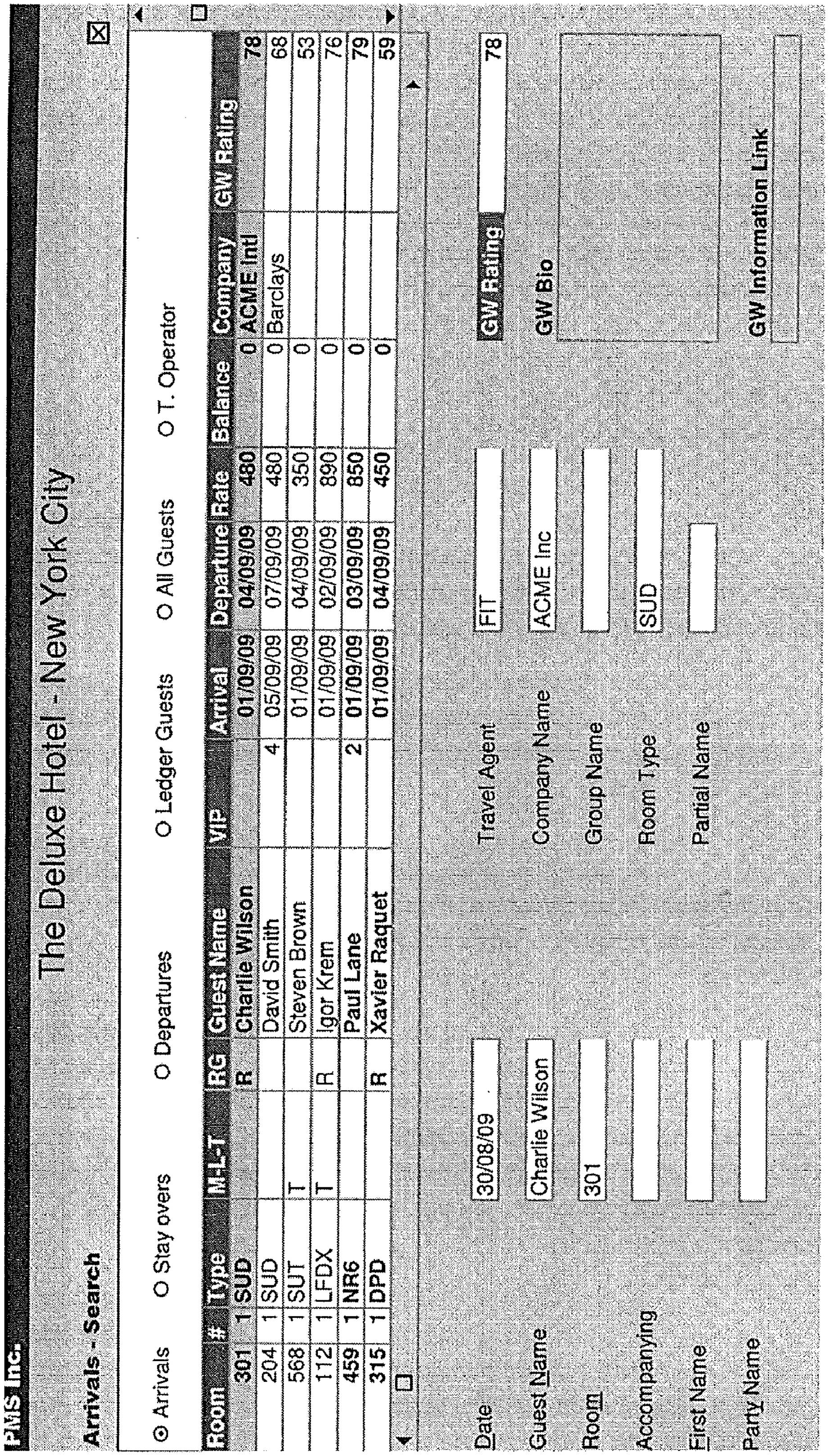
Figure 3C:
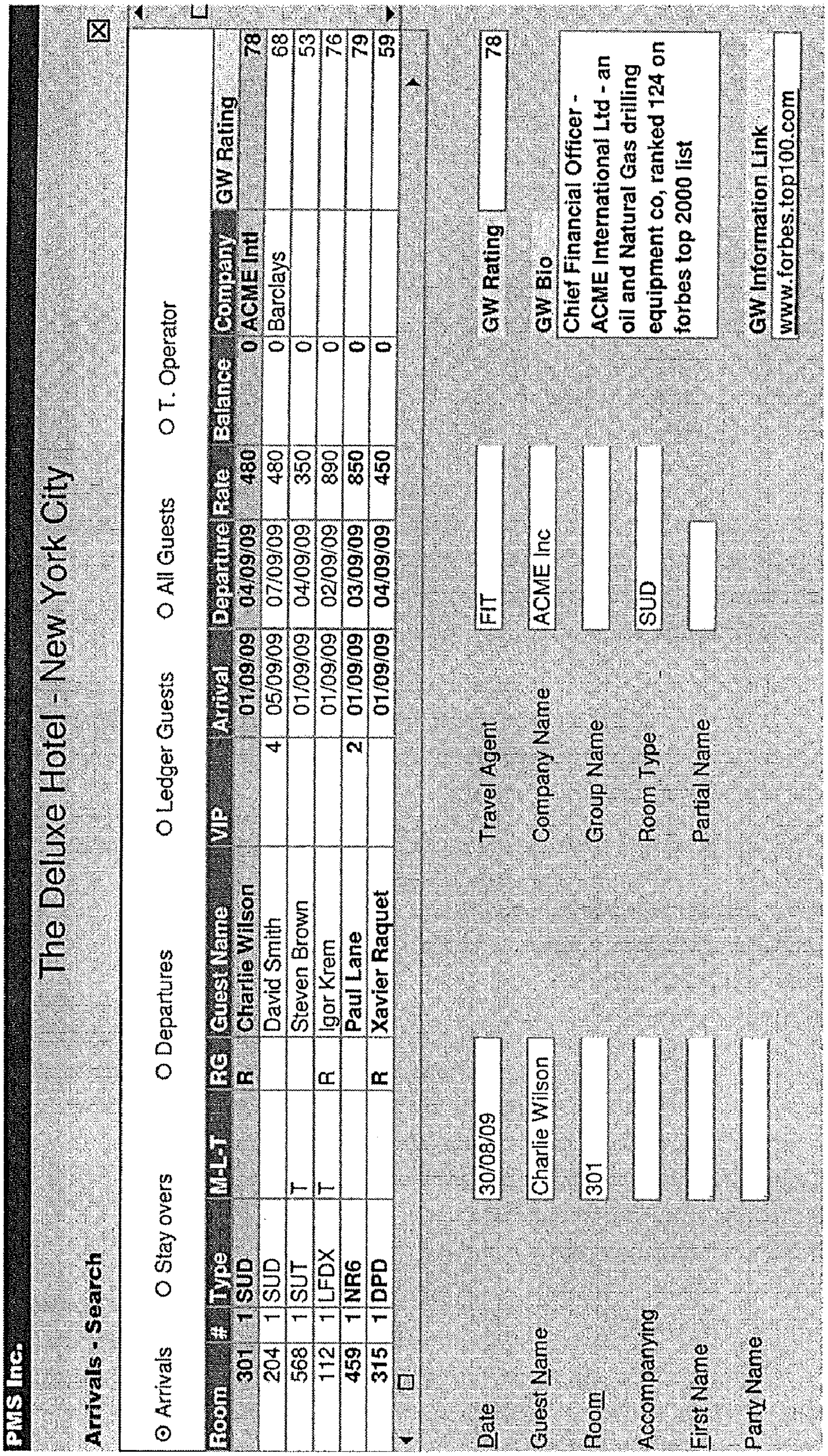

Reference is made to FIGS. 3A-3C, which are illustrations of summary reports of potential VIPs in the customer arrivals list integrated into a property management system, in accordance with an embodiment of the present invention. A bronze level summary report 305, shown in FIG. 3A, displays an asterisk adjacent to customers who may be VIPs, as determined by a customer arrivals list analyzer system. A silver level summary report 310, shown in FIG. 3B, displays an HVSIM for each customer identified as a possible VIP. In accordance with an embodiment of the present invention, the HVSIM for a customer is based on the number of pages that have information about the customer, from one or more designated web biography corpuses. The HVSIM is also based on a total number of web hits, referred to as the "web presence". The HVSIM is a score from 0 to 100 with higher ratings reflecting more influential customers. The HVSIM is generally a score from 0 to 100 with higher scores reflecting more important customers. As above, when system 110 has a high level of confidence that a listed customer is a VIP, the identified customer is displayed in bold.

A gold level summary report 315, shown in FIG. 3C, also provides brief biographical information about each customer identified as a possible VIP, and a link to a web page with additional information about the customer.

In the web interface usage scenario, an enterprise has access to a web service operative in accordance with the present invention, via a secure web interface. The web interface enables the enterprise to input a customer name, or a list of customer names, optionally with additional identifying or descriptive information about the customers; and to receive onscreen and/or printable and/or savable output, with annotations identifying important customers, and with levels of detail according to subscription level to the service.

Figure 4A:
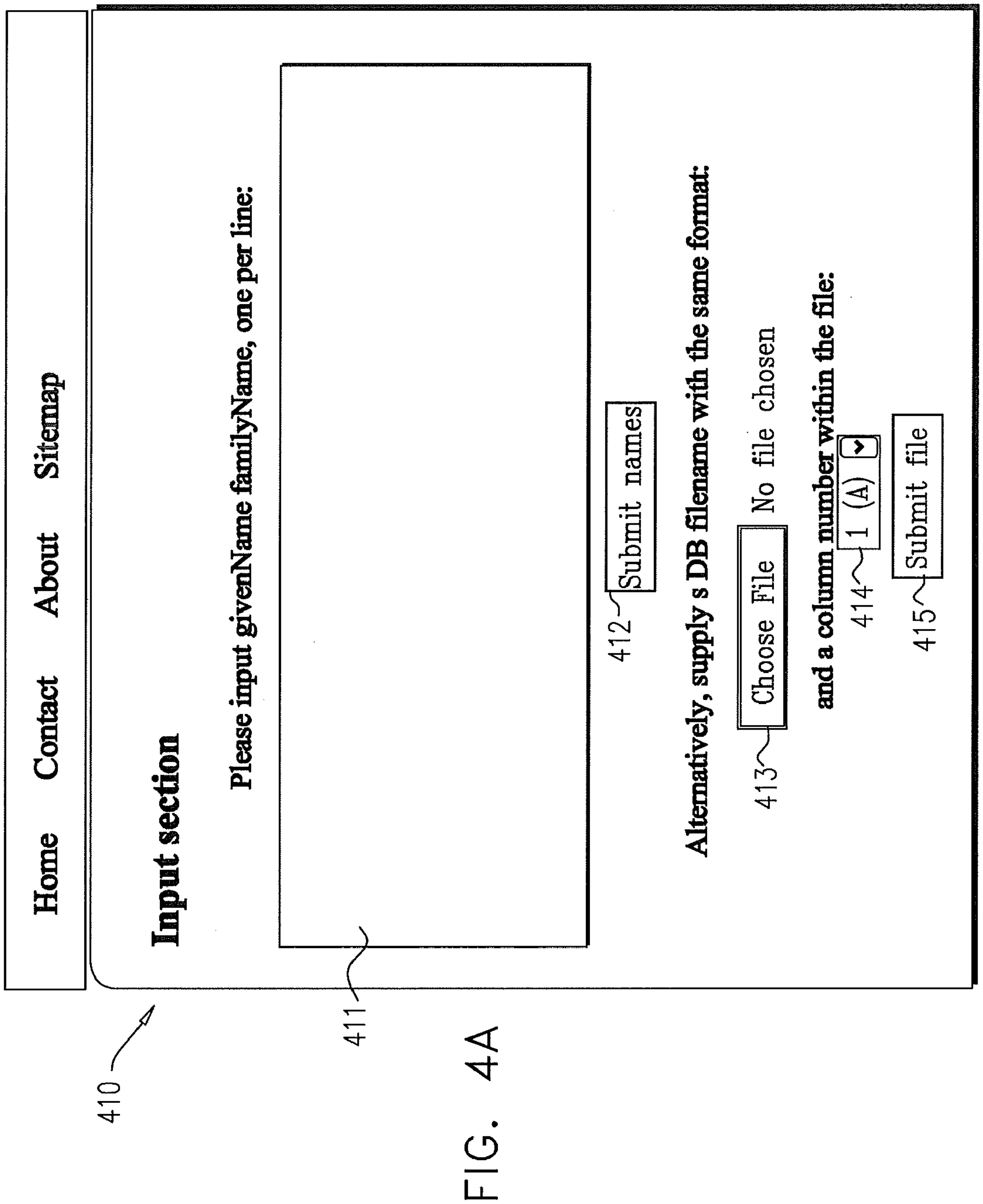
FIGS. 4A and 4B are illustrations of sample input screens for inputting one or more customer names for analysis by a web service operative in accordance with an embodiment of the present invention.
Figure 4B:
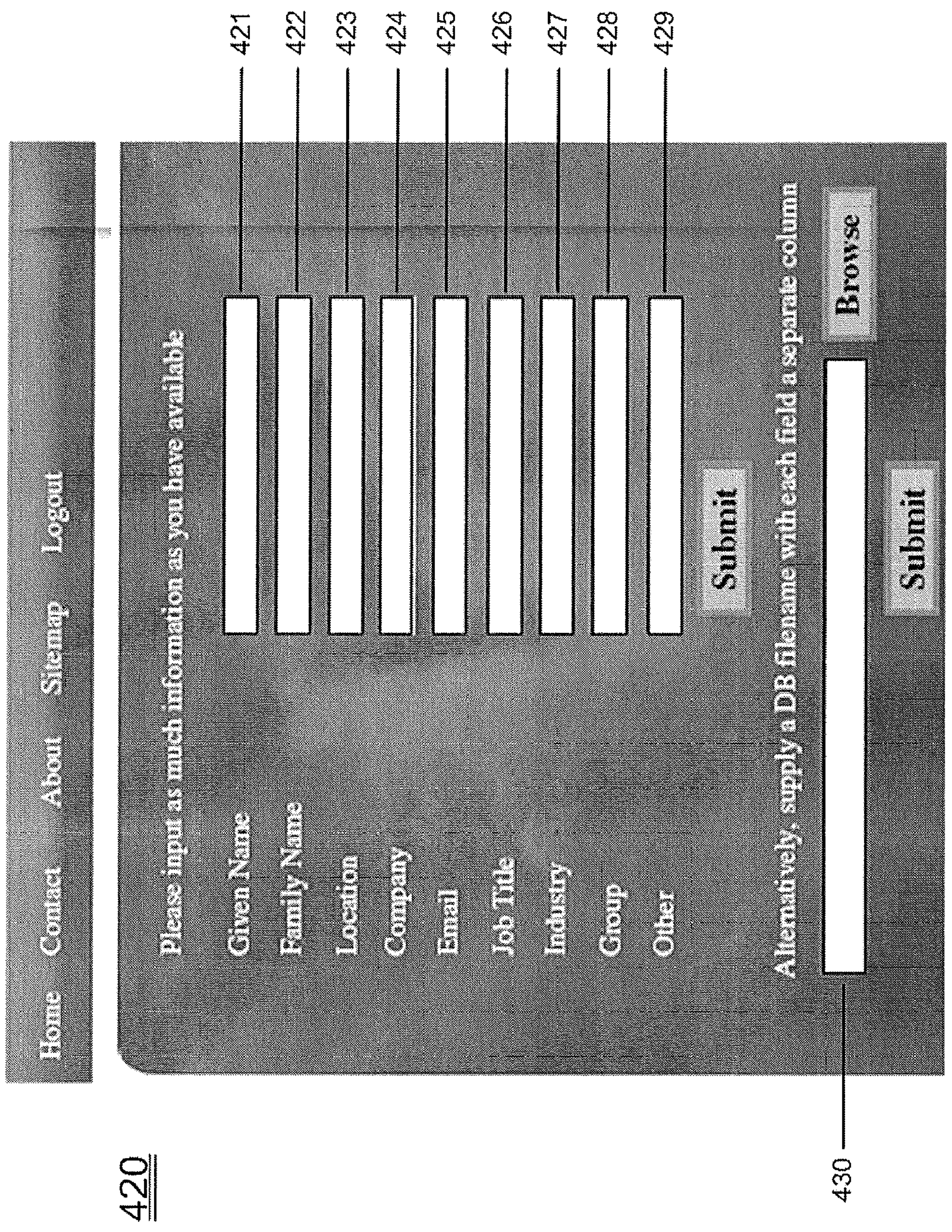

Reference is made to FIGS. 4A and 4B, which are illustrations of respective sample input screens 410 and 420 for inputting one or more customer names for analysis by a web service operative in accordance with an embodiment of the present invention. The web service illustrated in FIGS. 4A and 4B is a real-time service that can be used for immediate guest searches. Using screen 410, a user inputs one or more customer names in text box 411, and clicks on a "Submit names" button 412 to activate the web service. Alternatively, the user may upload a file with a customer list. The user clicks on a "Choose File" button 413 to designate the file he wishes to upload, and selects a column in the file from a pull-down menu 414, and then clicks on a "Submit file" button 415 to upload the file to the web service.

Using screen 420, a user inputs additional information about a customer that may be available from a customer arrivals list or from such other source of information. Specifically screen 420 includes respective fields 421, 422, 423, 424, 425, 426, 427, 428 and 429 for specifying a given name, a family name, a location, a company, an e-mail address, a job title, an industry, a group and other information. Alternatively, field 430 allows a user to provide a database filename for one or more customers, the database including records having corresponding fields for customer information.

Figure 4C:
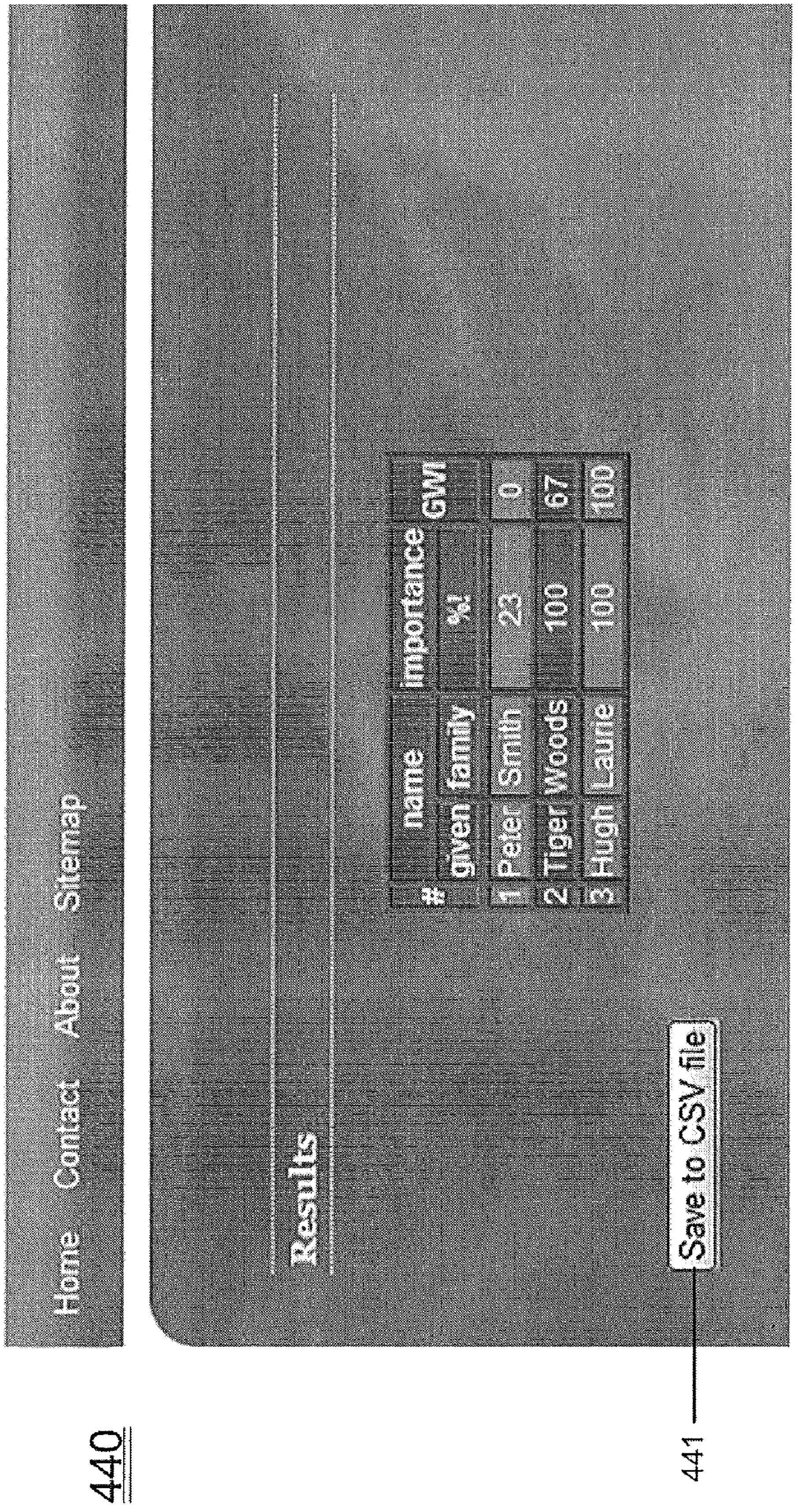
FIG. 4C is an illustration of a sample output screen generated by a web service operative in accordance with an embodiment of the present invention.

Reference is made to FIG. 4C, which is an illustration of a sample output screen 440 generated by a web service operative in accordance with an embodiment of the present invention. Output screen 440 displays the names of the customers that were analyzed, and an HVSIM for potential VIPs among the customers. In accordance with an embodiment of the present invention, the HVSIM for a customer is based on the number of pages that have information about the customer, from one or more designated web biography corpuses. The HVSIM is also based on a total number of web hits, referred to as the "web presence". The HVSIM is a score from 0 to 100 with higher ratings reflecting more influential customers.

Output screen 440 also includes a "Save to CSV File" 441 button for saving the output to a CSV file on the user's computer.

It will be appreciated by those skilled in the art that the present invention has wide application to any hospitality enterprise that has access to a customer arrivals list. Such enterprises include inter alia hotels, airlines, cruise ships car rental agencies and restaurants.

In accordance with an embodiment of the present invention, the enterprise may define its own custom criteria for measuring influence of a customer.

Figure 5:
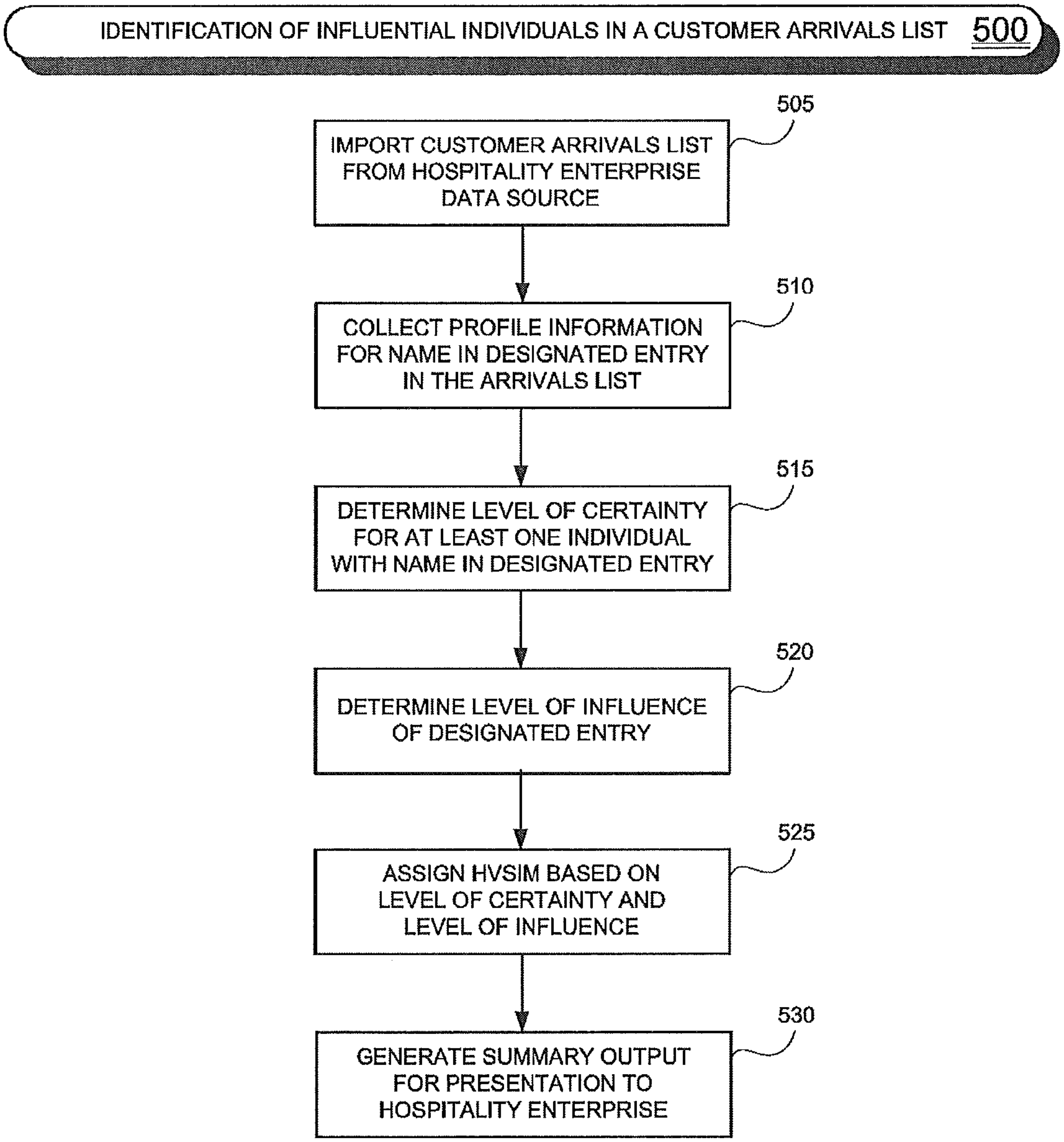
FIG. 5 is a simplified flowchart of a general method for identifying influential individuals in a customer arrivals list, in accordance with an embodiment of the present invention.

Reference is made to FIG. 5, which is a simplified flowchart of a general method for identifying influential individuals in a customer arrivals list, in accordance with an embodiment of the present invention. Method 500 begins at step 505 with import of a customer arrivals list from a hospitality enterprise data source. The enterprise may be inter alia a hotel, a cruise ship, a car rental agency or a restaurant. The customer arrivals list includes a plurality of entries, each entry including a name of an individual, and possibly additional information about the individual, including inter alia a physical address, an e-mail address, a date of birth, a place of employment, a job title, accompanying travelers, a travel agent and membership in hospitality rewards programs.

At step 510, profile information is collected from various data sources for individuals having a name that appears in a designated entry in the customer arrivals list. Such data sources include inter alia search engines such as GOOGLE®, social networks such as LINKEDIN®, and web biography corpuses such WIKIPEDIA®. It will be appreciated that often data sources relate to more than one individual having the same name as the name appearing in the designated entry. As such, at step 515 the profile information collected at step 510 is compared with data in the designated entry to determine a level of certainty for at least one such individual, the level of certainty indicating the likelihood that the individual does in fact correspond to the person in the arrivals list. At step 520 the profile information is analyzed to determine a level of influence for the designated entry.

At step 525, HSVIMs are assigned to the influential individuals identified at step 520. Finally, at step 535, output summarizing the influential individuals and their HVSIMs, is generated for presentation to the enterprise.

According to an embodiment of the present invention, in order to avoid collecting profile information at step 510 for individuals that are deceased, the data sources are queried using a text string such as "Peter Smith is (a OR an OR the OR one)". Corresponding search results will likely not include deceased individuals, since they would be referenced to in past tense such as "Peter Smith was".

Figure 6:
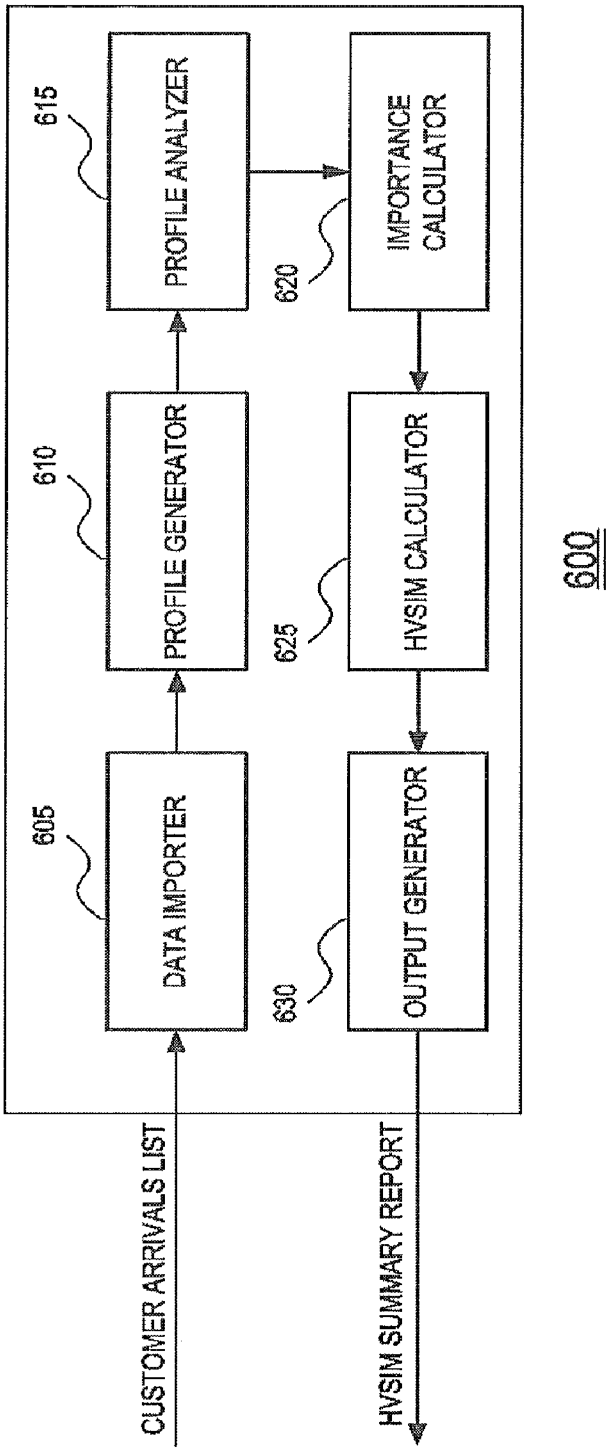
FIG. 6 is a simplified block diagram of a general system for identifying influential individuals in a customer arrivals list, in accordance with an embodiment of the present invention.

Reference is made to FIG. 6, which is a simplified block diagram of a general system for identifying influential individuals in a customer arrivals list, in accordance with an embodiment of the present invention. A data importer 605 imports a customer arrivals list from a hospitality enterprise data source. The enterprise may be inter alia hotel, a cruise ship, a car rental agency or a restaurant. The customer arrivals list includes a plurality of entries, each entry including a name of an individual, and possibly additional information about the individual, including inter alia a physical address, an e-mail address, a date of birth, a place of employment, a job title, accompanying travelers, a travel agent and membership in hospitality rewards programs.

A profile generator 610 collects profile information from various data sources for individuals having a name that appears in a designated entry in the customer arrivals list. Such data sources include inter alia search engines such as GOOGLE®, social networks such as LINKEDIN®, and web biography corpuses such as WIKIPEDIA®. It will be appreciated that often data sources relate to more than one individual having the same name. As such, a profile analyzer 615 analyzes the profile information collected by profile generator 610 to determine a level of certainty for at least one such individual, the level of certainty indicating the likelihood that the individual does in fact correspond to the person in the arrivals list.

An importance calculator 620 assigns one or more metrics of web importance to the individuals identified by profile analyzer 615. An HVSIM calculator 625 assigns HVSIMs to individuals identified by profile analyzer 615, based on the metrics of web importance assigned to them by importance calculator 620 and based on the level of certainty determined by profile analyzer 615. An output generator 625 generates a summary of the influential individuals and their HVSIMs, for presentation to the hospitality enterprise.

Figure 7:
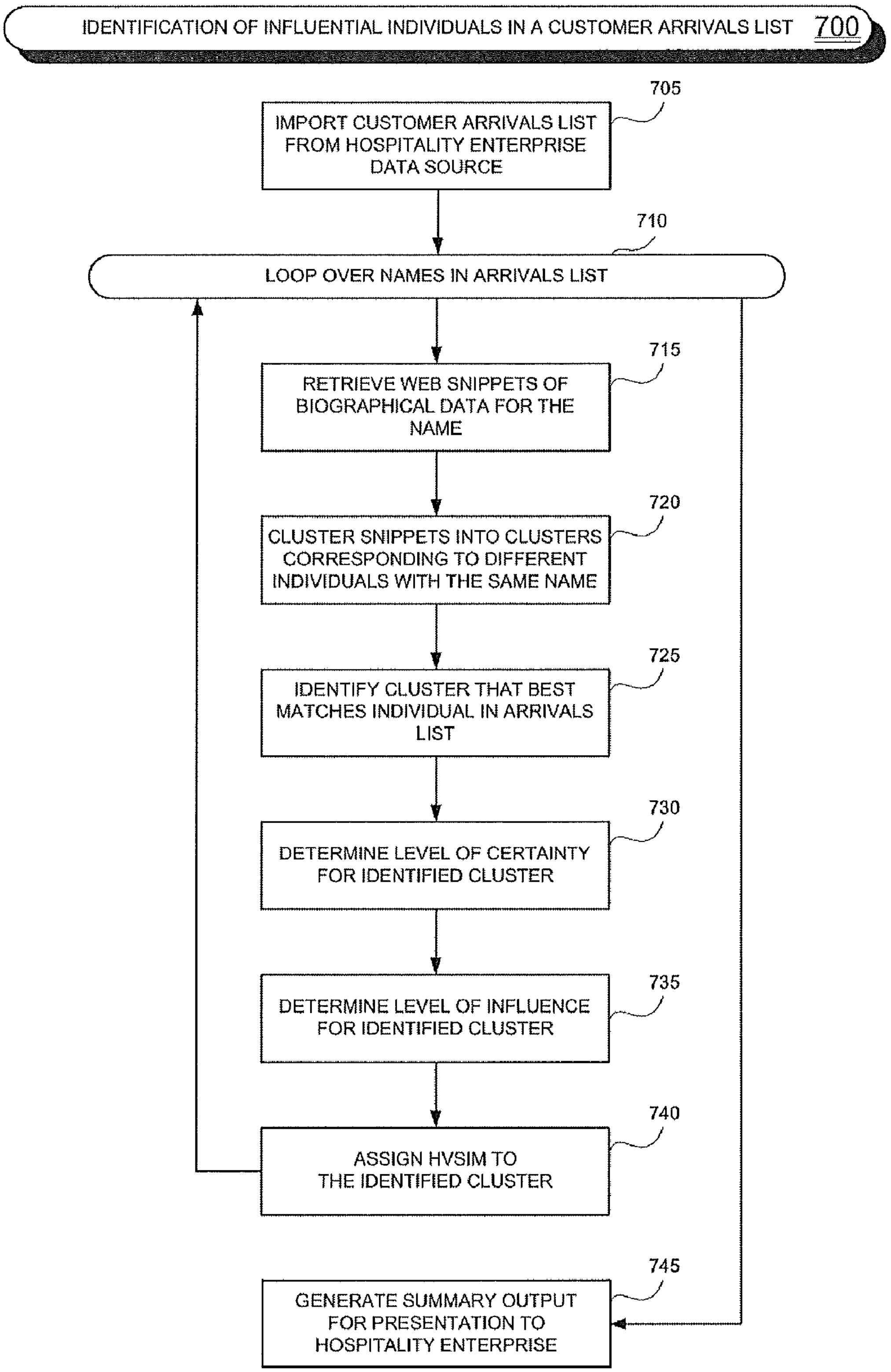
FIG. 7 is a simplified flowchart of a specific method for identifying influential individuals in a customer arrivals list, in accordance with an embodiment of the present invention.

Reference is made to FIG. 7, which is a simplified flowchart of a specific method 700 for identifying influential individuals in a customer arrivals list, in accordance with an embodiment of the present invention. Method 700 begins at step 705 with import of a customer arrivals list from a hospitality enterprise data source. The enterprise may be inter alia a hotel, a cruise ship, a car rental agency or a restaurant. The customer arrivals list includes a plurality of entries, each entry including a name of an individual, and possibly additional information about the individual, including inter alia a physical address, an e-mail address, a date of birth, a place of employment, a job title, accompanying travelers, a travel agent and membership in hospitality rewards programs.

At step 710 a processing loop over names in the customer arrivals list is started. At step 715, "web snippets" of biographical data for a designated name of an individual are retrieved from the Internet. A web snippet is a portion of relevant text data from a web page provided by a web data source. Although the web snippets relate to the designated name, they may however relate to different individuals having the same name, such as two or more Peter Smith's. At step 720, the web snippets are clustered into clusters of snippets, each cluster likely corresponding to a different person; i.e., there is a one-to-one correspondence between clusters and between different individuals having the designated name.

At step 725, the clusters are matched against known and given information regarding the individual in the customer arrivals list, to identify the cluster that corresponds to the person that best matches the customer in the customer arrivals list having the designated name. At step 730 a level of certainty is assigned to the cluster identified at step 725, the level of certainty indicating the likelihood that the identified cluster corresponds to the person named in the customer arrivals list. At step 735, a level of influence is assigned to the cluster identified at step 725, based on data gleaned from the web snippets, and possibly from other web data sources. At step 740, an HVSIM is assigned to the identified cluster, based on the level of certainty determined at step 730 and the level of influence determined at step 735.

After loop 710 finishes processing all of the names in the customer arrivals list, at step 745 summary output is generated for presentation to the hospitality enterprise.

Figure 8:
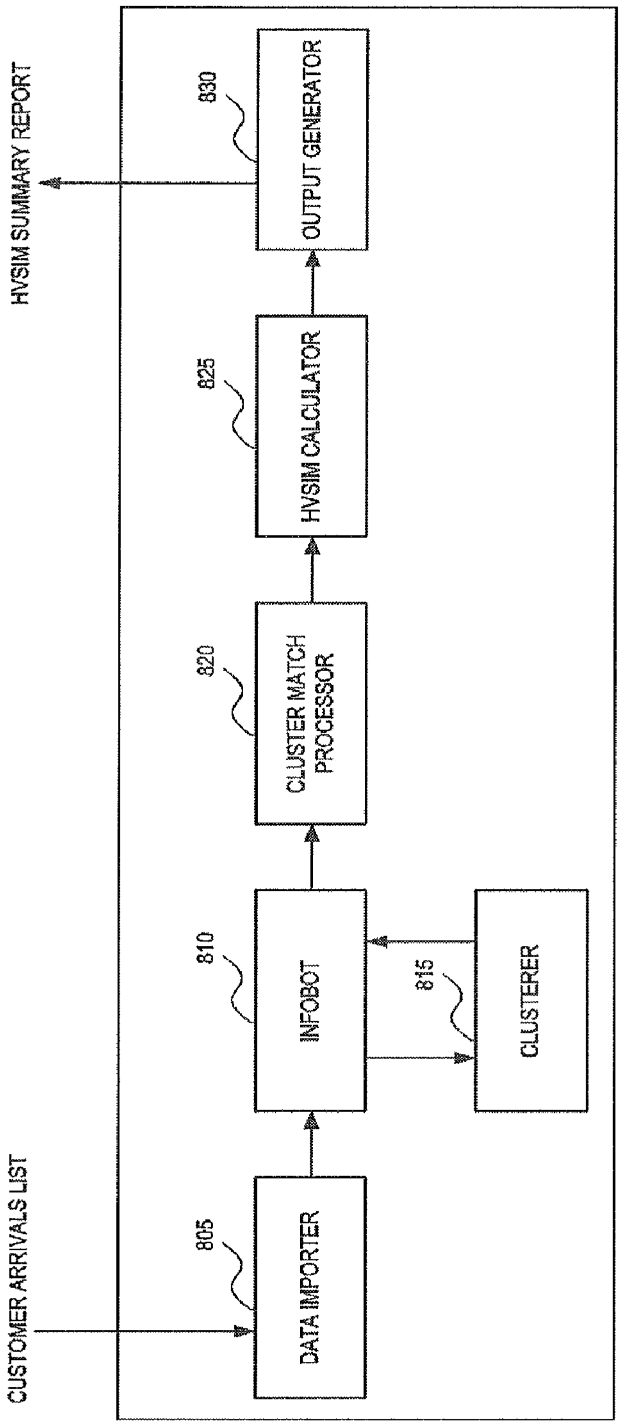
FIG. 8 is a simplified block diagram of a specific system for identifying influential individuals in a customer arrivals list, in accordance with an embodiment of the present invention.

Reference is made to FIG. 8, which is a simplified block diagram of a specific system 800 for identifying influential individuals in a customer arrivals list, in accordance with an embodiment of the present invention. A data importer 805 imports a customer arrivals list from a hospitality enterprise data source. The enterprise may be inter alia a hotel, a cruise ship, a car rental agency or a restaurant. The customer arrivals list includes a plurality of entries, each entry including a name of an individual, and possibly additional information about the individual, including inter alia a physical address, an e-mail address, a date of birth, a place of employment, a job title, accompanying travelers, a travel agent and membership in hospitality rewards programs.

An infobot 810 crawls the web to retrieve web snippets relating to a designated name appearing in the customer arrivals list. A clusterer 815 separates the retrieved web snippets into clusters of snippets, with each cluster likely corresponding to a different individual having the designated name.

A cluster match processor 820 matches the clusters against given and known information about the customer in the customer arrivals, to identify the cluster that corresponds to the person that best matches the customer in the customer arrivals list having the designated name. Known information includes inter alia information about the customer stored previously in a database.

An HVSIM calculator 825 identifies customers who are potential VIPs, and assigns HVSIMs to the potential VIPs, corresponding to their level of influence and to the level of certainty that the cluster identified by cluster match processor 820 does in fact correspond to the person in the customer arrivals list. An output generator 830 generates a summary of the VIPs and their HVSIMs, for presentation to the enterprise.

An implementation of the specific embodiment of the present invention, shown in FIGS. 7 and 8, is described in detail through a series of flowcharts shown in FIGS. 9-17. The specific implementation described uses CGI parameters for importing a customer arrivals list, and uses a web browser and/or CSV files for its output summaries. The flowcharts in FIGS. 9-17 may be implemented in software or firmware, or a combination of software and firmware.

Figure 9:
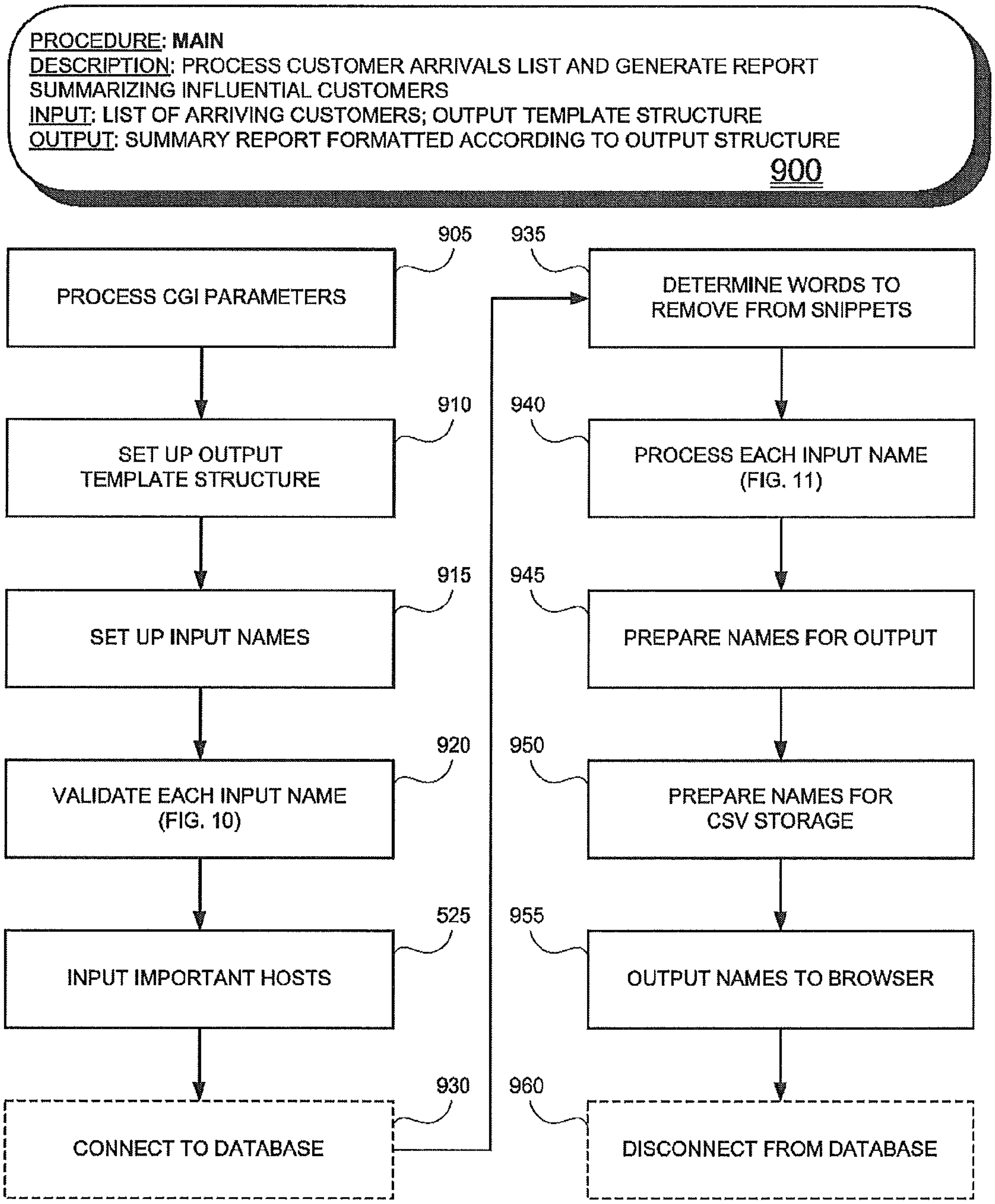
FIG. 9 is a simplified flowchart of a top-level method for receiving an arrivals list from a hospitality enterprise and automatically assigning HVSIMs to individuals in the list, in accordance with an embodiment of the present invention.

Reference is made to FIG. 9, which is a simplified flowchart of a top-level method 900 for receiving an arrivals list from a hospitality enterprise and automatically assigning HVSIMs to individuals in the list, in accordance with an embodiment of the present invention. An arrivals list is imported from the enterprise via Common Gateway Interface (CGI) parameters in an initial input web page. The arrivals list includes a plurality of entries formatted inter alia as lines of data or rows of a spreadsheet. Each entry includes a name of an individual. Each entry may include additional data about the individual, including inter alia a physical address, an e-mail address, a date of birth, a place of employment, a job title, accompanying travelers, a travel agent and membership in hospitality rewards programs. At step 905, the arrivals list is processed to generate a CGI hash variable.

At step 910, an output structure variable is instantiated. The output structure is determined by a template for a web browser, and includes inter alia (i) a column-sortable table, (ii) onMouseOver for displaying clusters, and (iii) a function to save the output to a CSV file.

At step 915, input names are set up by extracting input names from arrivals list entries. Alternatively, if the arrivals list is imported from a CSV/XSL file, then the input names are extracted from columns of the arrivals list. The extracted names are encoded as an array of hash references with respect to the CGI hash variable generated at step 905.

At step 920, each input name is validated as being a possibly hyphenated given name and a possibly hyphenated family name. Step 920 is described in detail in FIG. 10.

Figure 10:
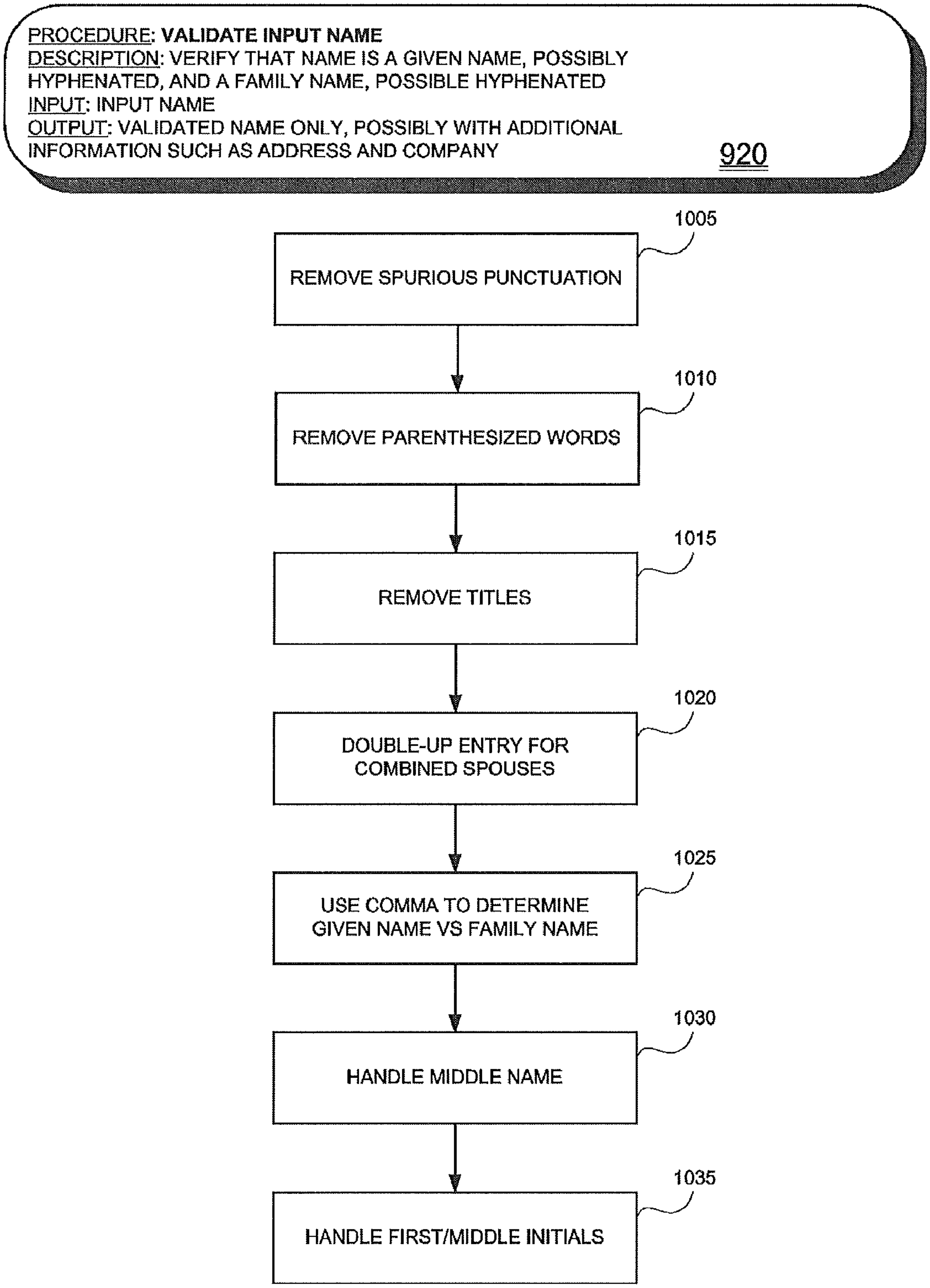
FIG. 10 is a simplified flowchart of a method for validating an input name, in accordance with an embodiment of the present invention.

Reference is made to FIG. 10, which is a simplified flowchart of a method for validating an input name, in accordance with an embodiment of the present invention. At step 1005, spurious punctuation, such as an asterisk, is removed from the input name. At step 1010, parenthesized words are removed from the input name. At step 1015, titles are removed from the input name. At step 1020, entries are doubled-up, one for each of combined spouses. At step 1025, a given name and a family name are determined, using a comma, if present, to assist in distinguishing the given name from the family name. Commas are helpful for names that include more than two words, indicating a hyphenated given name and/or a hyphenated family name. At step 1030, middle names, if present, are identified and later optionally used for searches in the web, in social networks and in designated web biography corpuses. Finally, at step 1035, first and middle initials, if present, are identified, and later optionally used for searches in the web, in social networks and in other networks.

Referring back to FIG. 9, after step 920 the input names are validated. At step 925, "important hosts" are input. Important hosts are already-determined URLs, stored in a dynamically changing list. The list may also include weights of importance assigned to the important hosts. Elements of this list, and their weights, are dynamically adjusted using machine learning techniques, based on ongoing analysis of new names that enter the system.

At step 930, connection is made to a database of names that were previously processed. Use of a database in embodiments of the present invention is optional and, as such, step 930 is optional and is thus shown with a dashed border.

At step 935, words to remove from snippets are determined. Such words include inter alia common English words, common web words and function words. The words to remove may be Porter stemmed. The words to remove are encoded as a hash of arrays of words.

At step 940, each input name that was validated at step 920 is processed. Step 940 is described in detail in FIG. 11.

Figure 11:
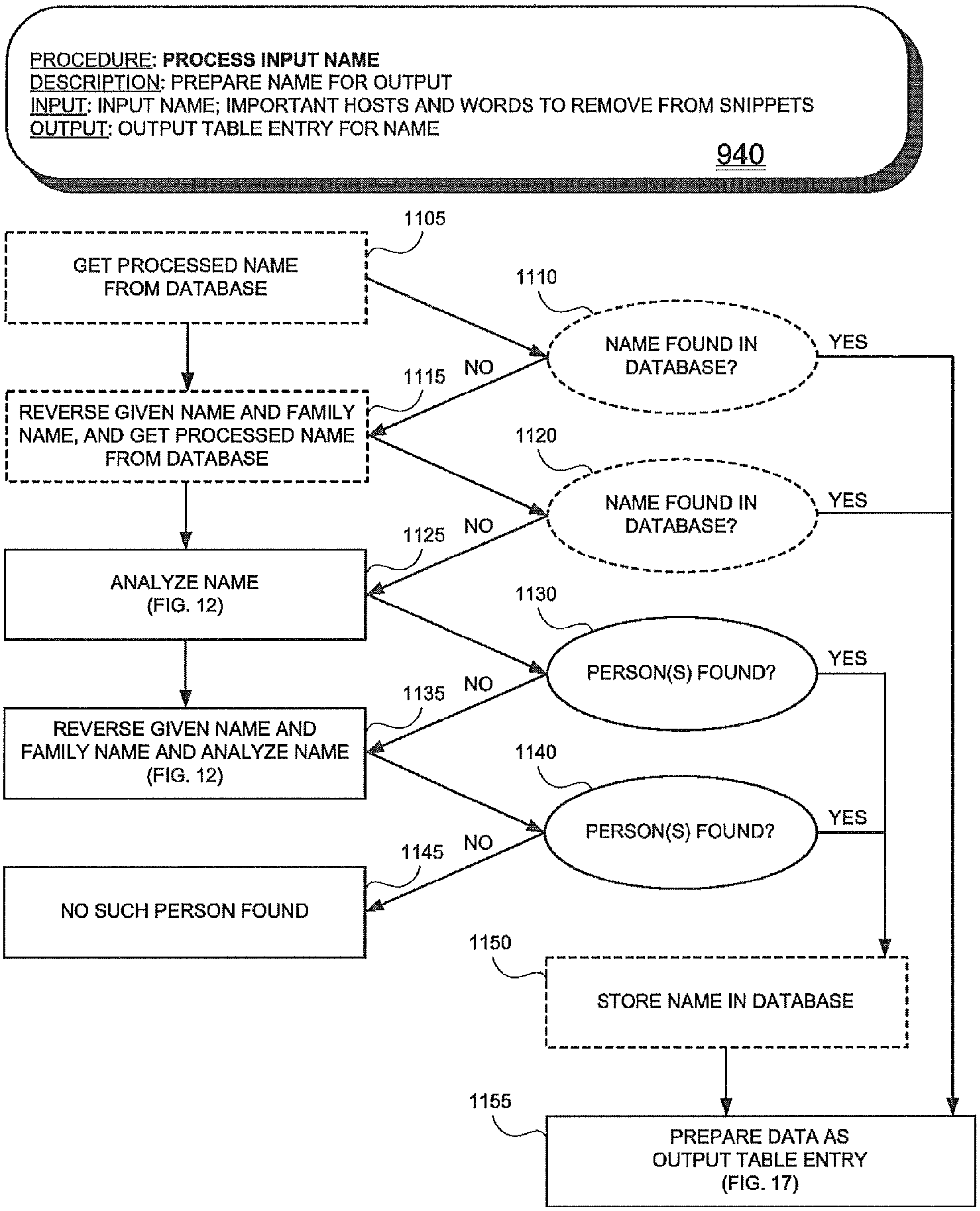
FIG. 11 is a simplified flowchart of a method for processing an input name, in accordance with an embodiment of the present invention.

Reference is made to FIG. 11, which is a simplified flowchart of a method for processing an input name, in accordance with an embodiment of the present invention. At step 1105, the input name is used to query a database. If the input name was previously processed then a record for the input name is found in the database, and stored data is retrieved at step 1.105. At step 1110, if the input name was previously processed, then the input name is found in the database, and processing is advanced to step 1155. Otherwise, processing is advanced to step 1115.

At step 1115, the given name and the family name are reversed, and the reversed name is used to query the database. If the reversed name is found in the database, stored data for the reversed name is retrieved at step 1115. At step 1120, if the reversed name is found in the database then processing is advanced to step 1155. Otherwise, processing is advanced to step 1125. Use of a database in embodiments of the present invention is optional and, as such, steps 1105-1120 are optional and are thus shown with dashed borders.

At step 1125, the input name is analyzed. Step 1125 is described in detail in FIG. 12.

Figure 12:
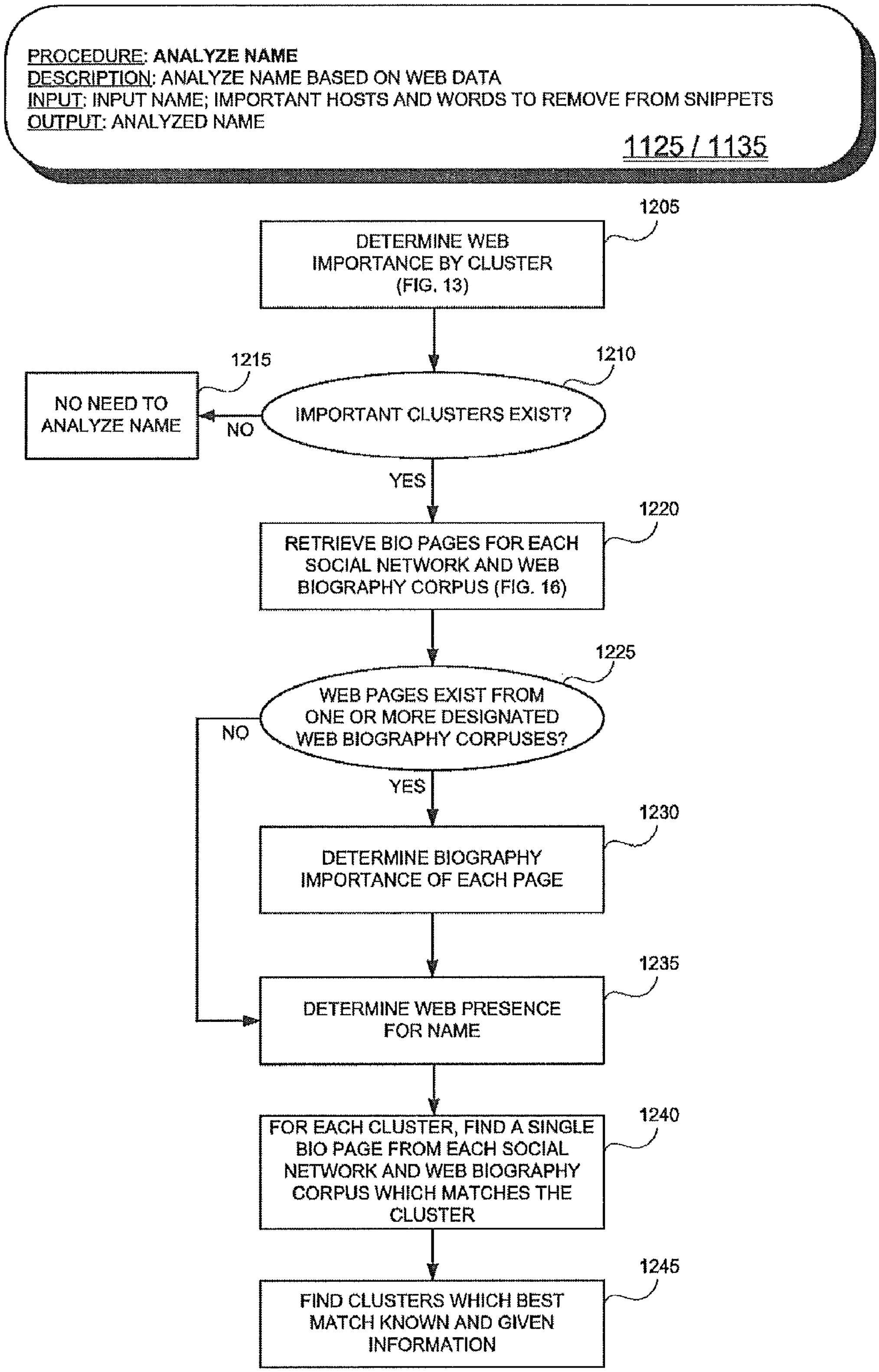
FIG. 12 is a simplified flowchart of a method for analyzing an input name, in accordance with an embodiment of the present invention.

Reference is made to FIG. 12, which is a simplified flowchart of a method for analyzing an input name, in accordance with an embodiment of the present invention. At step 1205, snippets of web references to the input name are clustered and a metric of "web importance" is assigned to the clusters based on importance of the references. The snippets may relate to more than one individual having the same name and, as such, clustering is used to disambiguate by separating the snippets into clusters of snippets, where each cluster likely relates to a different individual. Step 1205 is described in detail in FIG. 13.

Figure 13:
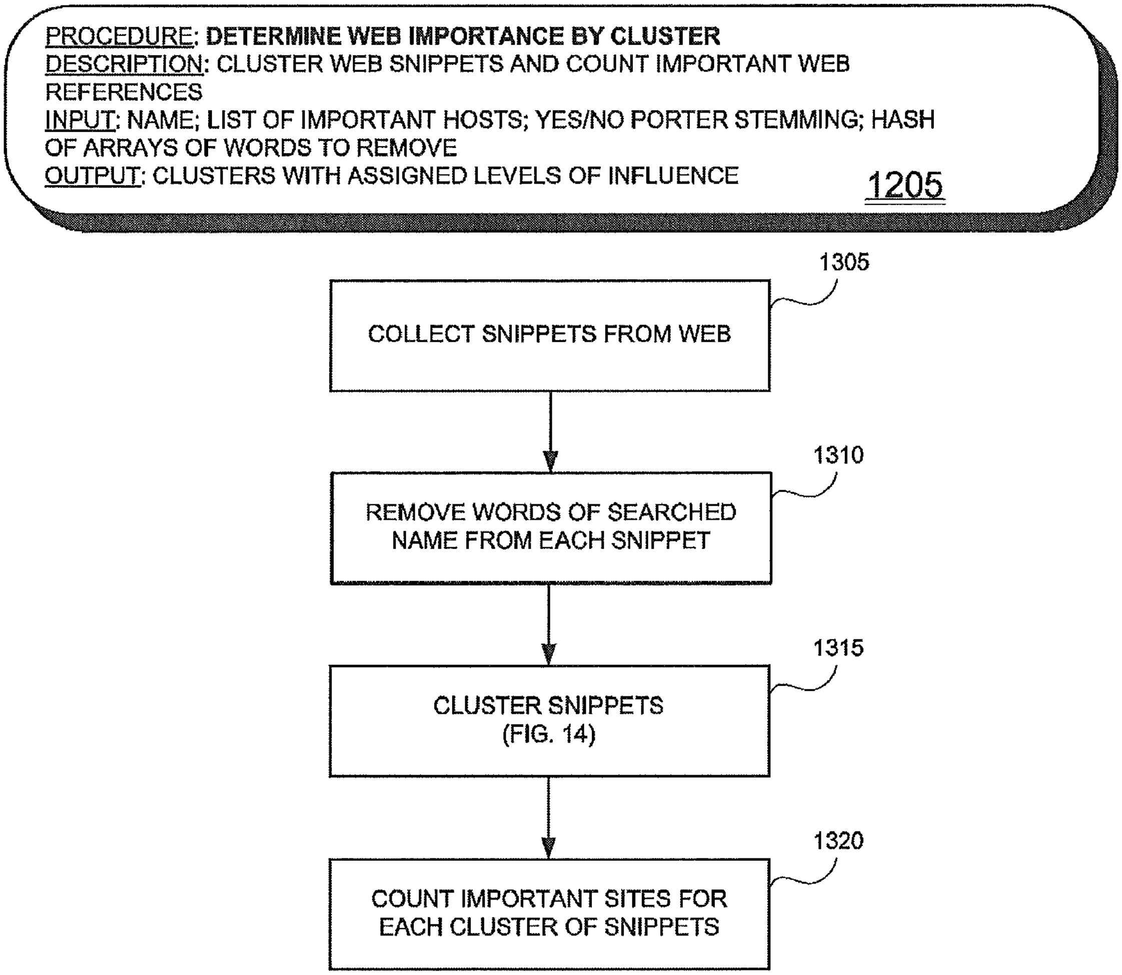
FIG. 13 is a simplified flowchart of a method for clustering web references and assigning levels of influence to the clusters, in accordance with an embodiment of the present invention.

Reference is made to FIG. 13, which is a simplified flowchart of a method for clustering web references and assigning levels of influence to the clusters, in accordance with an embodiment of the present invention. At step 1305, snippets of web references to an input name are collected from the web. The top N snippets about the name are requested, using an API of a search engine such as GOOGLE® or MICROSOFT BING™. Optionally the search appends "is" or "* is" in order to obtain principal pages about the individual. The number, N, may be on the order of 50-100 in some embodiments of the present invention.

At step 1310, words of the searched name are removed from each of the snippets. At step 1315 the snippets are clustered. Step 1315 is described in detail in FIG. 14.

Figure 14:
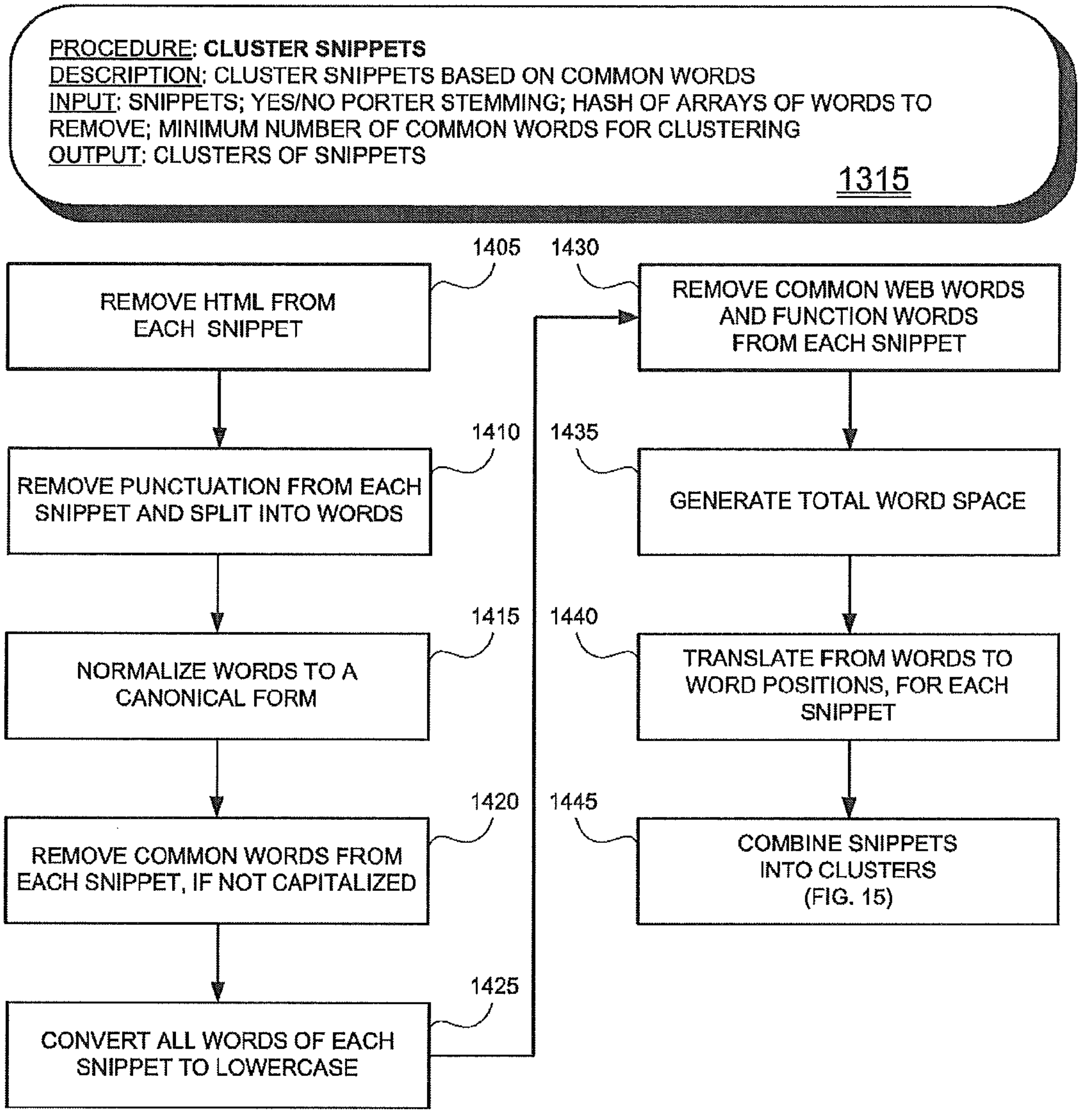
FIG. 14 is a simplified flowchart of a method for clustering snippets of web references, in accordance with an embodiment of the present invention.

Reference is made to FIG. 14, which is a simplified flowchart of a method for clustering snippets of web references, in accordance with an embodiment of the present invention. At step 1405, HTML syntax including inter alia HTML tags, is removed from each snippet. At step 1410, punctuation is removed from each snippet and the snippet is split into an array of words. At step 1415, if Porter stemming is used, the words are stemmed so as to normalize all words to a canonical form. At this stage, the array of words for each snippet is normalized, with capitalized words remaining capitalized. At step 1420, common words that are not capitalized are removed from each snippet. At step 1425, all words of each snippet are converted to lowercase. At step 1430, common web words and function words are removed from each snippet, even if they had been capitalized prior to step 1425.

At step 1435 a total word space is generated by creating a dictionary of all words in the snippets, with their associated alphabetical positions within the dictionary. The dictionary is designated as an array of words [w1, w2, . . . , wn], where n=N_DICT is the size of the dictionary.

At step 1440 the dictionary created at step 1435 is used to translate from words to word positions, for each snippet. In one embodiment of the present invention, occurrence of words is recorded without word frequencies. According to this embodiment, after step 1440, each snippet is encoded as an array of bits, instead of an array of words. Specifically, each snippet is encoded as an array of bits [b1, b2, . . . bn], where bk=1 if word wk is present in the snippet, and bk=0otherwise, and where n=N_DICT is the size of the dictionary. In an alternative embodiment of the present invention, occurrence of words is recorded with word frequencies. According to this embodiment, after step 1440, each snippet is encoded as an array of non-negative integers, instead of an array of words. Specifically, each snippet is encoded as an array of non-negative integers [f1, f2, . . . , fn], where fk is the frequency of word wk in the snippet, and where n=N_DICT is the size of the dictionary.

At step 1445 the numbers in the array are combined into clusters, based on common array dictionary positions. Use of arrays of numbers instead of arrays of words enables application of statistical clustering algorithms. Step 1445 is described in detail in FIG. 15.

Figure 15:
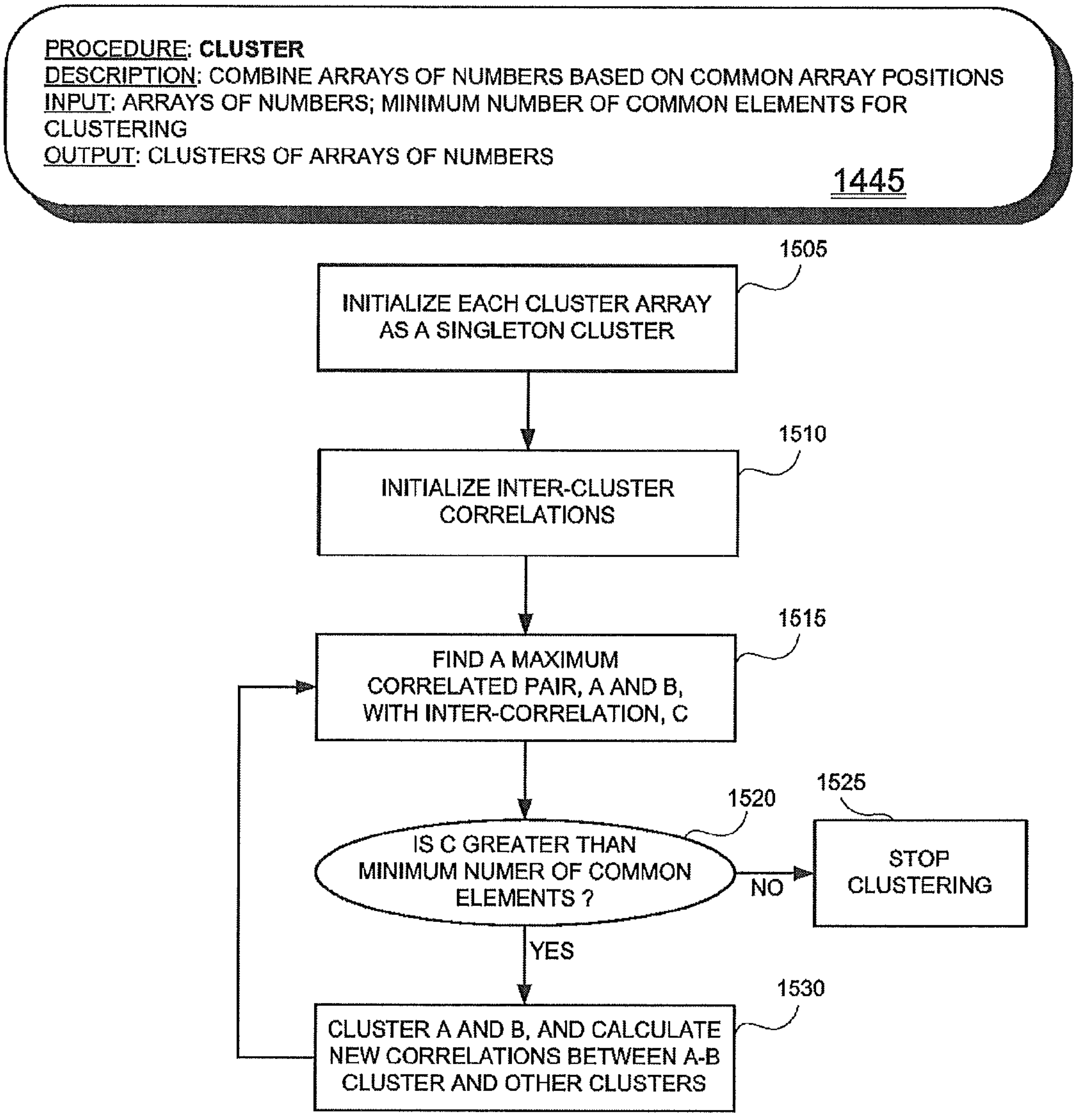
FIG. 15 is a simplified flowchart of a method for clustering snippets encoded as arrays of numbers, in accordance with an embodiment of the present invention.

Reference is made to FIG. 15, which is a simplified flowchart of a method for clustering arrays of numbers, in accordance with an embodiment of the present invention. The method of FIG. 15 proceeds iteratively by combining clusters until the inter-cluster correlations, as described hereinbelow, are less than a prescribed minimum number of common elements for clustering. In one embodiment of the present invention, which uses results from GOOGLE®, the prescribed minimum number of common elements is in the range 2-4, but it will be appreciated that this parameter may vary greatly depending on the size of the dictionary, on the lengths of the snippets, on the networks searched on the web, and on other such factors. Moreover, this parameter may be adjusted in order to increase or decrease the level of discrimination. For example, if two Peter Smith's are incorrectly clustered together, then the prescribed minimum number of common elements may be increased to correct this.

At step 1505, each cluster is initialized as a singleton cluster, with one snippet per cluster. At step 1510, inter-cluster correlations corr(A,B) are initialized between all clusters A and B. Inter-cluster correlations are calculated as follows.

Having encoded each snippet as an array of bits, in an occurrence-based embodiment of the present invention, or as an array of non-negative numbers, in a frequency-based embodiment of the present invention, it is straightforward to encode a cluster of snippets as such a respective array. Specifically, in the occurrence-based embodiment, a cluster, A, is encoded as an array of bits [b1, b2, . . . , bn], where bk=1 if word wk of the dictionary appears in any of the snippets in cluster A. Such a bit array corresponds to a logical OR operation of the bit arrays of each of the encoded snippets in cluster A. In the frequency-based embodiment, a cluster, A, is encoded as an array of non-negative integers [f1, f2, . . . , fn], where fk is the total number of occurrences of word wk of the dictionary in the snippets in cluster A. Such an array corresponds to addition of the arrays of each of the encoded snippets in cluster A.

Having defined encoded arrays for clusters, the inter-cluster correlation between clusters A and B is defined as the scalar product of the encoded clusters of A and B, corresponding to a logical AND operation, in the occurrence-based embodiment of the present invention; and as the normalized scalar product of the encoded clusters of A and B, in the frequency-based embodiment of the present invention. Normalization is provided by dividing the scalar product by the number of distinct words in A and by the number of distinct words in B.

For example, in the occurrence-based embodiment of the present invention, if cluster A is encoded as the array of bits [1, 1, 1, 0, 1, 1] and if cluster B is encoded as the array of bits [1, 0, 1, 0, 1, 1], then corr(A, B)=4. In the frequency-based embodiment of the present invention, if cluster A is encoded as the array of non-negative integers [2, 6, 3, 0, 7, 4] and if cluster B is encoded as the array of non-negative integers [4, 0, 3, 0, 2, 1], then corr(A, B)=35/(5*4)=1.75.

At step 1515 a maximal correlated pair of clusters, A and B, with inter-cluster correlation, C=corr(A,B), is found. At step 1520 a determination is made whether or not C is greater than the prescribed minimum number of common elements for clustering. If not, then processing advances to 1525 and the clustering is finished. Otherwise, then at step 1530, A and B are joined to a merged cluster (A-B), and updated correlations between the new (A-B) cluster and the other clusters are calculated.

In the occurrence-based embodiment of the present invention, the updated correlations are calculated as the maximum inter-cluster correlation between the merged cluster (A-B) and other clusters, denoted X. I.e., for a cluster, X, the new correlation corr((A-B), X) is the maximum of (i) corr(A,X), (ii) corr(B,X), and (iii) corr((A U B),X), the union being occurrence-based and not frequency-based. In the frequency-based embodiment of the present invention, the updated correlation is calculated using a centroid method for correlating X with a normalized union of A and B, the union being frequency-based and not occurrence-based. Processing then returns to step 1515.

Referring back to FIG. 13, after step 1315 the snippets have been clustered into clusters that likely correspond to different individuals; i.e., each cluster represents one person. At step 1320, the number of important web sites that refer to each individual is counted, and is used as a level of influence for the individual.

Referring back to FIG. 12, after step 1205, there is a one-to-one correspondence between clusters and individual persons, and each cluster has a metric of web importance, corresponding to a number of important URLs, assigned thereto. At step 1210 a determination is made as to whether or not any important clusters exist. If not, there is no need to analyze the name, as indicated at step 1215. Otherwise, if important clusters do exist, then at step 1220, bio pages for the people corresponding to the influential clusters are retrieved from one or more social networks, such as LINKEDIN® and ZOOMINFO®, and from one or more web biography corpuses such as WIKIPEDIA®. Step 1220 is described in detail in FIG. 16.

Figure 16:
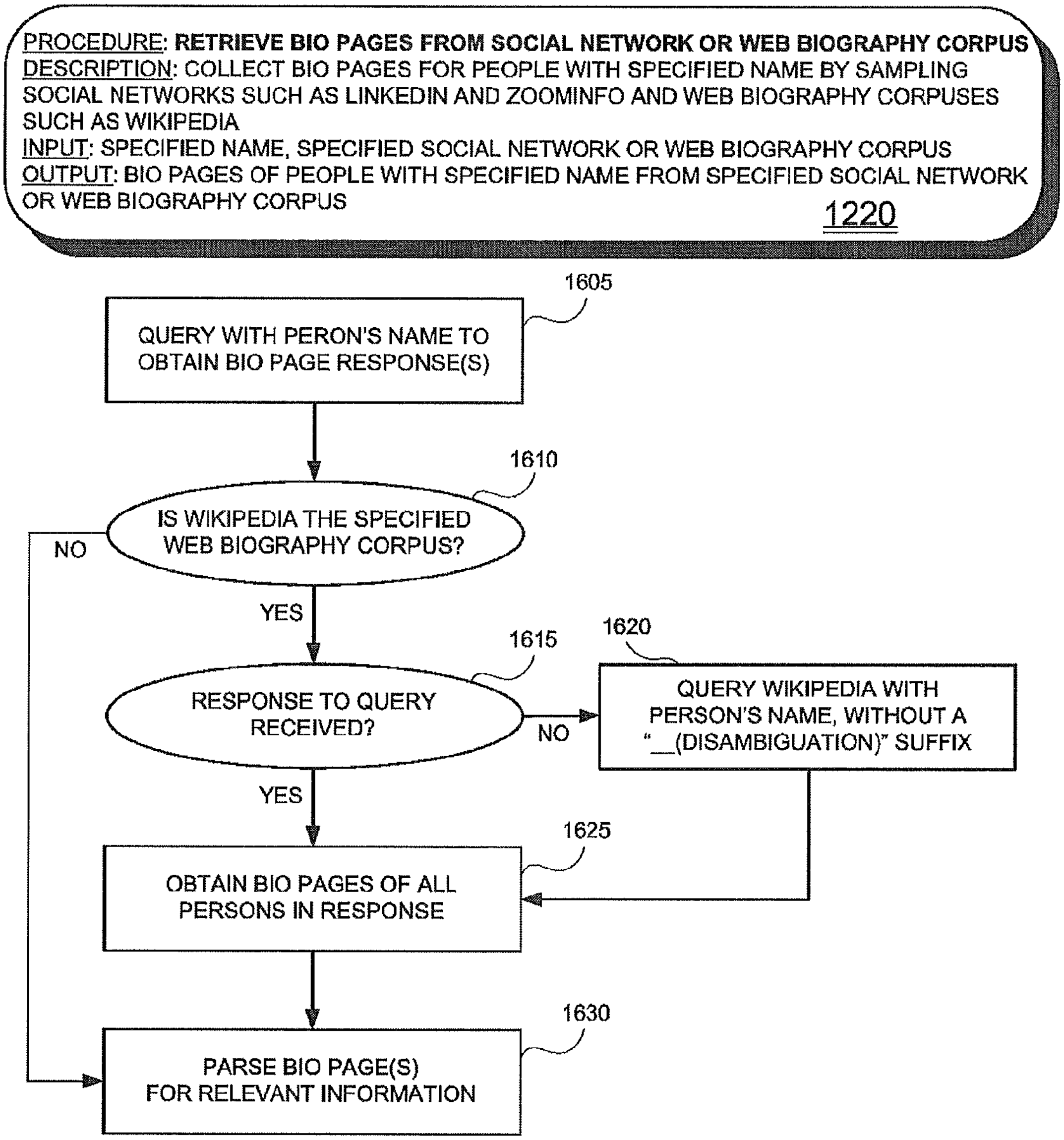
FIG. 16 is a simplified flowchart of a method for retrieving bio pages for a person from a designated social network or web biography corpus, in accordance with an embodiment of the present invention.

Reference is made to FIG. 16, which is a simplified flowchart of a method for retrieving bio pages for a person from a designated social network or web biography corpus, in accordance with an embodiment of the present invention. At step 1605 the designated social network or web biography corpus is queried with the person's name, to obtain one or more HTML bio web pages therefrom. At step 1610 a determination is made whether the designated web biography corpus is Wikipedia. If not, then processing advances to step 1630.

Wikipedia generally provides a disambiguation page if more than one Wikipedia page exists for a person's name. For example, if there is more than one Wikipedia page for Peter Smith, then Wikipedia provides a "Peter_Smith_(disambiguation)" page that references all of the Peter Smith's in Wikipedia. The query at 1605 is for a page with a "_(disambiguation)" suffix. If it is determined at step 1610 that the designated web biography corpus is Wikipedia, then at step 1615 a further determination is made whether a page with a "_(disambiguation)" suffix was received from Wikipedia in response to the query made at step 1605. If not, then at step 1620 Wikipedia is queried for a page with the person's name, without the "_(disambiguation)" suffix. If such a page exists, then it is generally the only page for the person's name; e.g., the only Peter Smith page. Occasionally, a page without a "_(disambiguation)" suffix is itself a disambiguation page, e.g., with all of the Peter Smith's listed, even though the page does not have a "_(disambiguation)" suffix. Processing then advances to step 1625, where bio pages of all persons in the response are obtained. If a page with a "_(disambiguation)" suffix was received from Wikipedia in response to the query made at step 1605, then processing advances directly from step 1615 to step 1625.

At step 1630 the bio page(s) obtained are parsed for relevant information, including physical address, e-mail address, company, title, industry and date of birth/death, and other descriptors.

Referring back to FIG. 12, after step 1220 bio pages have been retrieved for some or all of the people corresponding to the clusters. At step 1225 a determination is made whether or not web pages were retrieved at step 1220 from one or more designated web biography corpuses. People with biography pages from web biography corpuses are generally influential individuals. If so, then at step 1230 a metric of "biography importance" is derived. In one embodiment of the present invention, the biography importance is derived by searching the web for websites outside of the one or more designated web biography corpuses that link to the person's pages in the one or more designated web biography corpuses, using an API for a search engine such as GOOGLE® or MICROSOFT BING™. The number of such links is used as the biography importance. If web pages for the person from the one or more designated web biography corpuses do not exist, as determined at step 1225, then step 1230 is skipped.

At step 1235, a metric of "web presence" for the person is derived. The metric of web presence may reflect the number of search results for the person obtained, for example from GOOGLE® or MICROSOFT BING™. At step 1240, for each cluster, the bio page, from among the bio pages retrieved for each social network and web biography corpus at step 1220, which best matches the cluster based on matching words and/or relevant information, is found. The identified bio page is used to obtain biographical information for the person corresponding to the cluster. The biographical information may include inter alia a physical address, an e-mail address, a company, a title, an industry, a date of birth, and additional information parsed from web biography corpus pages, social network bio pages, and the company web page.

At step 1245, individuals with the same name are disambiguated by finding clusters that best match the known and given information for the person of that name in the list of arrivals. Clusters deemed unimportant at step 1205 may also be taken into consideration at step 1245.

Referring back to FIG. 11, after analyzing the name at step 1125, if the name was found, then step 1130 advances processing to step 1150. Otherwise, step 1130 advances processing to step 1135 where the given name and the family name are reversed, and the reversed name is analyzed. Analysis of the reversed name is also performed as indicated in FIG. 12. If the reversed name was found, then step 1140 advances processing to step 1150. Otherwise, the method is unable to identify a person with the input name, as indicated at step 1145.

At step 1150 the information for the input name is stored in a database for future reference. Use of a database in embodiments of the present invention is optional and, as such, step 1150 is optional and is thus shown with a dashed border.

At step 1155, the biographical data for the individuals associated with the input name is formatted as an output table entry. Step 1155 is described in detail in FIG. 17.

Figure 17:
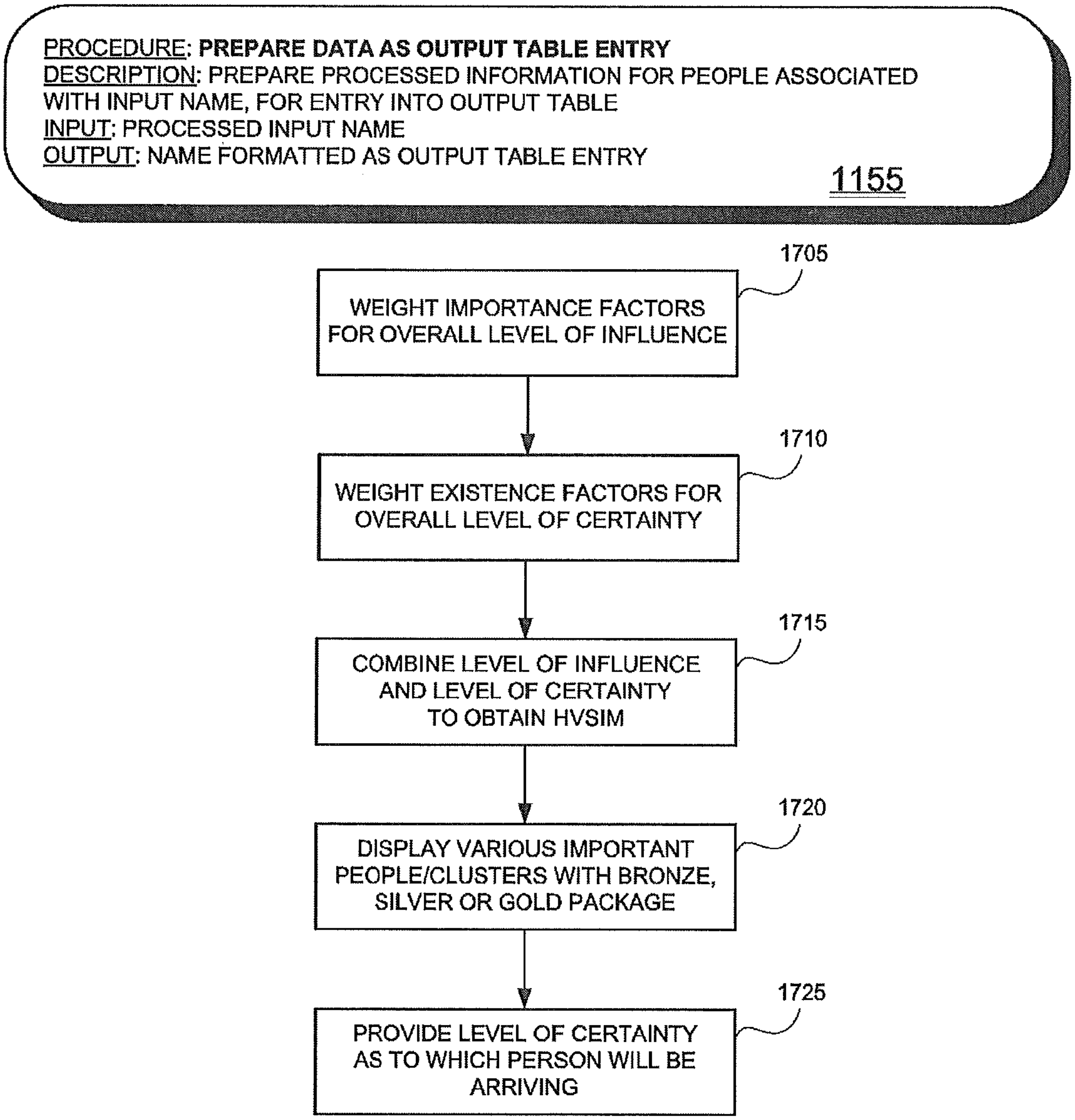
FIG. 17 is a simplified flowchart of a method for preparing biographical data for output table entry, in accordance with an embodiment of the present invention.

Reference is made to FIG. 17, which is a simplified flowchart of a method for preparing biographical data for output table entry, in accordance with an embodiment of the present invention. At step 1705 the importance factors derived at steps 1205, 1230 and 1235 are averaged with weights that were determined using machine learning techniques from previous analyzed names, to derive an overall level of influence, say, between 0 and 100, one score per cluster/person. At step 1710 uniqueness factors are averaged with weights that were determined using machine learning techniques from previous analyzed names, to derive an overall level of certainty, say, between 0 and 100, reflecting how well the individual in the arrivals list has been disambiguated by clustering, and how common his name is.

The weights used in steps 1705 and 1710 may be dynamically adjusted by the machine learning techniques. Specifically, people who are independently known to be influential and people who are independently known not to be influential are processed to determine their various importance factors and uniqueness factors. Weighting factors are then adjusted so that the importance score and uniqueness score best match the independently known results. The thus adjusted weights are used for future inference.

At step 1715, the level of influence and the level of certainty are combined to generate a rating, say, between 0 and 100. Individuals with high ratings are recognized as being potential VIPs.

At step 1720, the potential VIPs are displayed to the enterprise. Different levels of biographical detail may be displayed based, on an enterprise subscription level. For example, for bronze level subscribers, the display may simply include asterisks indicating which individuals in the arrivals list are potential VIPs. For silver level subscribers, the HVSIM generated at step 1715 may be displayed. For gold level subscribers, a short biographical description of each potential VIP may also be displayed. At step 1725, the level of certainty is displayed, indicating how likely each individual displayed is in fact the same individual as the customer in the arrivals list.

Referring back to FIG. 9, after step 940 each of the input names in the list of arrivals has been processed. At step 945 the output template structure instantiated at step 910 is populated with the processed input names. At step 950 the output is prepared and formatted for storage in a CSV file. At step 955 the now-populated output template structure is transmitted to a web browser. Finally, at step 960 the database connection opened at step 930 is closed, to disconnect from the database. Use of a database in embodiments of the present invention is optional and, as such, step 960 is optional and is thus shown with a dashed border.

Although the embodiments of the present invention described hereinabove include analysis of a name to determine the identity of one or more individuals having that name, other embodiments of the present invention are of advantage in assigning an HVSIM to an individual or entity whose identity is known a priori.

Figure 18:
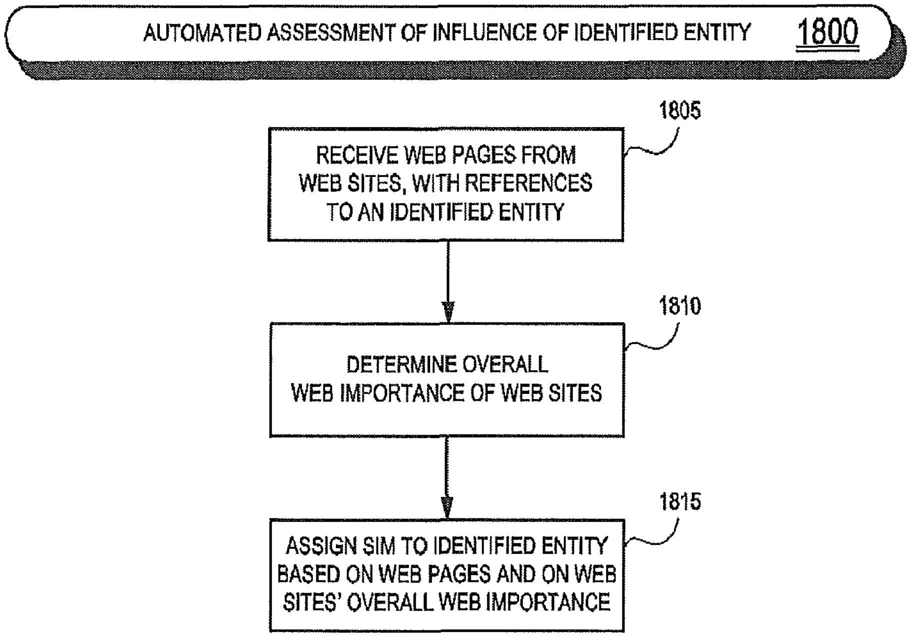
FIG. 18 is a simplified flowchart of a method for assessing the influence of an identified entity, in accordance with an embodiment of the present invention.

Reference is made to FIG. 18, which is a simplified flowchart of a method for assessing the influence of an identified entity, in accordance with an embodiment of the present invention. At step 1805 web pages with references to an identified entity are received from a plurality of web sites. At step 1810 an overall web importance is determined for the plurality of web sites. The overall web importance may be determined by combining individual web importance scores, based on a list of web sites and their individual web importance scores. At step 1815 a selection influence metric (SIM) is assigned to the identified entity based on the web pages received at step 1805 and on the overall web importance score determined at step 1810. In one embodiment of the present invention, the SIM is obtained by dividing the number of web pages received at step 1805 by the overall web importance score determined at step 1810. However, it will be appreciated by those skilled in the art that other calculations may be used instead to derive the SIM at step 1815.

Figure 19:
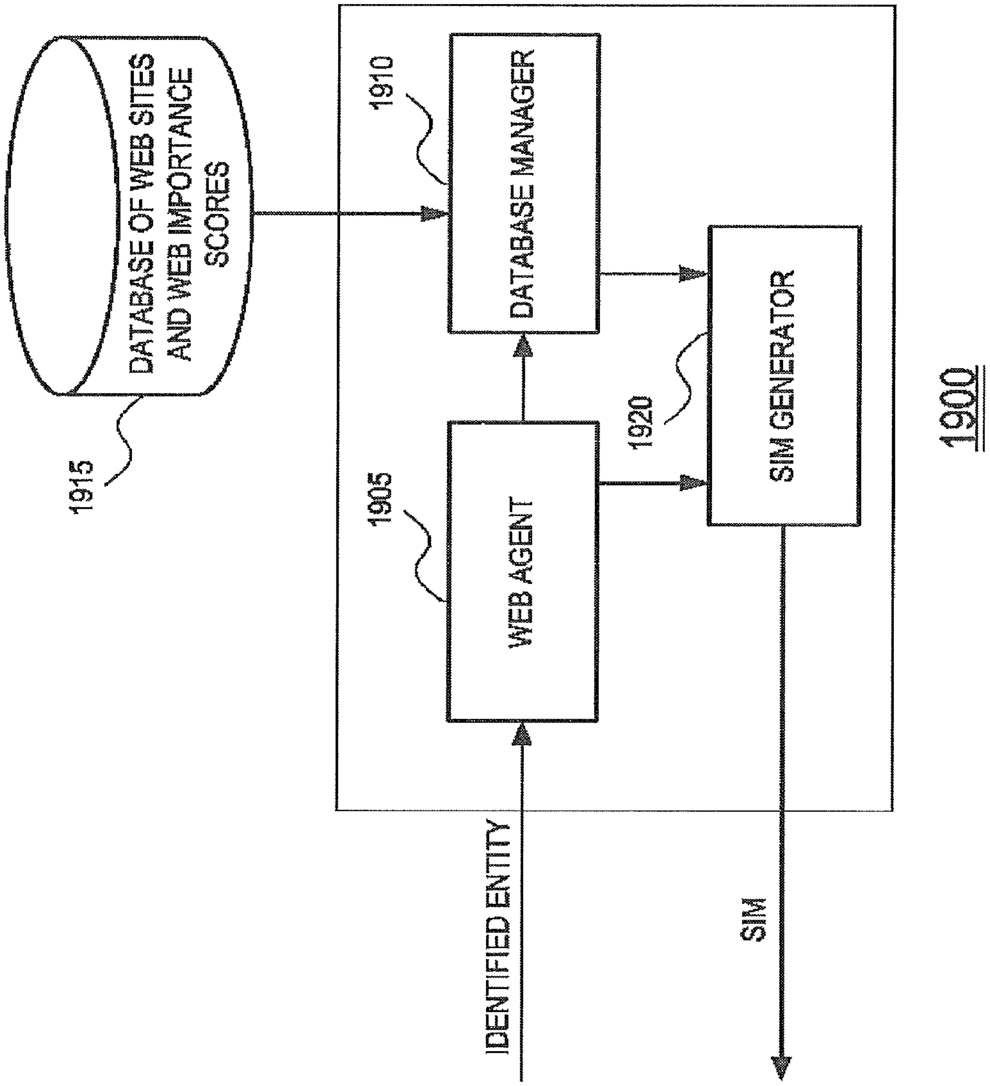
FIG. 19 is a simplified block diagram of a system for automatically assessing the influence of an identified entity, in accordance with an embodiment of the present invention.

Reference is made to FIG. 19, which is a simplified block diagram of a system for automatically assessing the influence of an identified entity, in accordance with an embodiment of the present invention. A web agent 1905 crawls the web to retrieve web pages with references to an identified entity, from a plurality of web sites. A database manager 1910, for a database 1915, determines an overall web importance of the plurality of web sites from information in database 1915. In one embodiment of the present invention, database 1915 stores web sites and individual web importance scores therefor, and database manager 1910 combines the individual web importance scores to determine the overall web importance of the plurality of web sites. A selection influence metric (SIM) generator 1920 assigns a SIM to the identified entity based on the web pages retrieved by web agent 1905 and based on the overall web importance score determined by database manager 1910. In one embodiment of the present invention, the SIM is obtained by dividing the number of web pages retrieved by web agent 1905 by the overall web importance score determined by database manager 1910. However, it will be appreciated by those skilled in the art that other calculations may be used instead to derive the SIM.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for identifying influential individuals in a customer arrivals list, comprising:

importing a customer arrivals list from a hospitality enterprise data source, wherein the arrivals list comprises a plurality of entries, each entry corresponding to a customer and comprising at least a name of the customer;

collecting profile information for the name in a designated entry in the arrivals list, from designated sources on the web, said designated sources comprising at least one designated web biography corpus;

assigning a web importance score to each of said designated sources;

when said profile information identifies one or more individuals who have the name in the designated entry:

determining a level of certainty for at least one of the one or more identified individuals, that the identified individual be the same individual as the customer corresponding to the designated entry, based on data in the designated entry;

determining a level of influence for the designated entry, based on the collected profile information, said level of influence being based on a ranking of the relative significance, in the context of the hospitality industry, of said designated sources that refer to said at least one of the one or more identified individuals, said ranking being based at least partly on said web importance score; and assigning a hospitality venue selection influence metric (HVSIM) to the designated entry which indicates the extent to which said at least one of the one or more identified individuals is likely to determine or influence, actively or passively, the decisions of other people in their selection of a hospitality venue, based on said level of influence.

2. The method of claim 1 wherein said collecting profile information comprises retrieving web pages with biographical information for the name.

3. The method of claim 1 wherein the level of influence is based on the existence of at least one web page for the name from said at least one designated web biography corpus, and on a number of links to such web pages from web pages outside said at least one designated web biography corpus.

4. The method of claim 3 wherein said at least one designated web biography corpus include Wikipedia.

5. The method of claim 1 wherein the hospitality enterprise is a member of the group consisting of a hotel, a cruise ship, a car rental agency and a restaurant.

6. A computer implemented system for identifying influential individuals in a customer arrivals list, comprising:

a computerized data importer for importing a customer arrivals list from a hospitality enterprise data source, wherein the arrivals list comprises a plurality of entries, each entry corresponding to a customer and comprising at least a name of the customer;

a computerized profile generator, coupled with said data importer, for collecting profile information for the name in a designated entry in the arrivals list, from designated sources on the web, said designated sources comprising at least one designated web biography corpus;

a storage device for storing a list of said designated sources and a web importance score associated with each of said designated sources;

a computerized profile analyzer, coupled with said data importer and with said profile generator, (i) for determining a level of certainty for at least one individuals whose profile information was collected by said profile generator, that the at least one individual be the same individual as the customer corresponding to the designated entry, based on data in the designated entry, and (ii) for determining a level of influence for the designated entry, based on the profile information collected by said profile generator, said level of influence being based on a ranking of the relative significance, in the context of the hospitality industry, of said designated sources that refer to said at least one individual, said ranking being based at least partly on said web importance score; and a computerized hospitality venue selection influence metric (HVSIM) calculator, coupled with said data importer and with said profile analyzer, for assigning an HVSIM, which indicates the extent to which said at least one individual is likely to determine or influence, actively or passively, the decisions of other people in their selection of a hospitality venue, to the designated entry, based on the level of influence determined by said profile analyzer.

7. The system of claim 6 wherein said profile generator retrieves web pages with biographical information for the name.

8. The system of claim 6 wherein the level of influence is based on the existence of at least one web page for the name, retrieved by said profile generator from said at least one designated web biography corpus, and on a number of links to such web pages from web pages outside said at least one designated web biography corpus.

9. The system of claim 8 wherein said at least one designated web biography corpus include Wikipedia.

10. The system of claim 6 wherein the enterprise is a member of the group consisting of a hotel, a cruise ship, a car rental agency and a restaurant.

11. A method for identifying influential individuals in a customer arrivals list, comprising:

importing a customer arrivals list from a hospitality enterprise data source, wherein the arrivals list comprises a plurality of entries, each entry corresponding to a customer and comprising at least a name of the customer;

retrieving web snippets of biographical data for the name in a designated entry in the arrivals list, said web snippets including text data from designated web pages;

automatically assigning a web importance score to each of said designated web pages;

clustering the retrieved web snippets into clusters corresponding to different individuals with the same name;

identifying the cluster corresponding to an individual that best matches the customer corresponding to the designated entry;

determining a level of certainty that the identified cluster corresponds to the designated entry in the arrivals list;

automatically determining a level of influence of the identified cluster, based on the web snippets in the cluster, said level of influence being based on a ranking of the relative significance, in the context of the hospitality industry, of said web pages, said ranking being based at least partly on said web importance score; and assigning a hospitality venue selection influence metric (HVSIM), which indicates the extent to which said individual is likely to determine or influence, actively or passively, the decisions of other people in their selection of a hospitality venue, to the identified cluster, based on the level of influence.

12. The method of claim 11 wherein the level of influence is based on the number of web snippets retrieved for the individual corresponding to the identified cluster.

13. The method of claim 11 wherein the level of influence is based on the existence of at least one web snippet for the individual corresponding to the identified cluster, retrieved from one or more designated web biography corpuses.

14. The method of claim 13 wherein the one or more designated web biography corpuses include Wikipedia.

15. A computer implemented system for identifying influential individuals in a customer arrivals list, comprising:

a computerized data importer, for importing a customer arrivals list from a hospitality enterprise data source, wherein the arrivals list comprises a plurality of entries, each entry corresponding to a customer and comprising at least a name of the customer;

an infobot, coupled with said data importer, for retrieving web snippets of biographical data for the name in a designated entry in the arrivals list, said web snippets including text data from designated web pages;

a storage device for storing a list of said designated web pages and a web importance score associated with each of said designated web pages;

a computerized clusterer, coupled with said infobot, for clustering the retrieved web snippets into clusters corresponding to different individuals with the same name;

a computerized cluster matcher, coupled with said clusterer, with said infobot and with said data importer, for identifying the cluster corresponding to an individual that best matches the customer corresponding to the designated entry;

a computerized hospitality venue selection influence metric (HVSIM) calculator, coupled with said cluster matcher and with said infobot, (i) for determining a level of influence of the identified cluster, based on the web snippets in the cluster, said level of influence being based on a ranking of the relative significance, in the context of the hospitality industry, of said web pages, said ranking being based at least partially on said web importance score, and (ii) for assigning an HVSIM, which indicates the extent to which said individual is likely to determine or influence, actively or passively, the decisions of other people in their selection of a hospitality venue, to the identified cluster, based on the level of influence.

16. The system of claim 15 wherein said HVSIM calculator determines the level of influence based on the number of web snippets for the individual corresponding to the identified cluster, retrieved by said infobot.

17. The system of claim 15 wherein said HVSIM calculator determines the level of influence based on the existence of at least one web snippet for the individual corresponding to the identified cluster, retrieved by said infobot from one or more designated web biography corpuses.

18. The system of claim 17 wherein the one or more designated web biography corpuses include Wikipedia.

19. The method of claim 1 and also comprising dynamically adjusting said web importance score.

20. The system of claim 6 wherein said web importance scores are dynamically updated.

21. The method of claim 11 and also comprising dynamically adjusting said web importance score.

22. The system of claim 15 wherein said web importance scores are dynamically updated.

* * * * *